US007080057B2

(12) United States Patent
Scarborough et al.

(10) Patent No.: US 7,080,057 B2
(45) Date of Patent: Jul. 18, 2006

(54) ELECTRONIC EMPLOYEE SELECTION SYSTEMS AND METHODS

(75) Inventors: David J. Scarborough, West Linn, OR (US); Bjorn Chambless, Portland, OR (US); Richard W. Becker, Portland, OR (US); Thomas F. Check, Beaverton, OR (US); Deme M. Clainos, Lake Oswego, OR (US); Maxwell W. Eng, Portland, OR (US); Joel R. Levy, Portland, OR (US); Adam N. Mertz, Portland, OR (US); George E. Paajanen, West Linn, OR (US); David R. Smith, Beaverton, OR (US); John R. Smith, Hillsboro, OR (US)

(73) Assignee: Unicru, Inc., Beaverton, OR (US)

( * ) Notice: Subject to any disclaimer, the term of this patent is extended or adjusted under 35 U.S.C. 154(b) by 546 days.

(21) Appl. No.: 09/922,197

(22) Filed: Aug. 2, 2001

(65) Prior Publication Data

US 2002/0046199 A1 Apr. 18, 2002

Related U.S. Application Data

(60) Provisional application No. 60/223,289, filed on Aug. 3, 2000.

(51) Int. Cl.
*G06N 5/04* (2006.01)
(52) U.S. Cl. .............................. 706/60; 706/14; 706/12
(58) Field of Classification Search ................ 706/60, 706/14, 12; 600/545
See application file for complete search history.

(56) References Cited

U.S. PATENT DOCUMENTS

| 5,059,127 A | 10/1991 | Lewis et al. |
| 5,117,353 A | 5/1992 | Stipanovich et al. |
| 5,164,897 A | 11/1992 | Clark et al. |
| 5,170,362 A | 12/1992 | Greenberg et al. |

(Continued)

FOREIGN PATENT DOCUMENTS

WO WO 99/17242 A2 4/1999

OTHER PUBLICATIONS

Ajay K. Aggarwal, Selection of Surgical Residents: A Neural Network Approach, 2000, Cybernetics and Systems, 417-430.*

(Continued)

*Primary Examiner*—Joseph P. Hirl
(74) *Attorney, Agent, or Firm*—Klarquist Sparkman LLP

(57) ABSTRACT

An automated employee selection system can use a variety of techniques to provide information for assisting in selection of employees. For example, pre-hire and post-hire information can be collected electronically and used to build an artificial-intelligence based model. The model can then be used to predict a desired job performance criterion (e.g., tenure, number of accidents, sales level, or the like) for new applicants. A wide variety of features can be supported, such as electronic reporting. Pre-hire information identified as ineffective can be removed from a collected pre-hire information. For example, ineffective questions can be identified and removed from a job application. New items can be added and their effectiveness tested. As a result, a system can exhibit adaptive learning and maintain or increase effectiveness even under changing conditions.

12 Claims, 20 Drawing Sheets

U.S. PATENT DOCUMENTS

| | | | |
|---|---|---|---|
| 5,197,004 | A | 3/1993 | Sobotka et al. |
| 5,326,270 | A | 7/1994 | Ostby et al. |
| 5,416,694 | A | 5/1995 | Parrish et al. |
| 5,461,699 | A | 10/1995 | Arbabi et al. |
| 5,490,097 | A | 2/1996 | Swenson et al. |
| 5,551,880 | A | 9/1996 | Bonnstetter et al. |
| 5,565,316 | A | 10/1996 | Kershaw |
| 5,592,375 | A | 1/1997 | Salmon et al. |
| 5,618,182 | A | 4/1997 | Thomas |
| 5,671,409 | A | 9/1997 | Fatseas et al. |
| 5,722,418 | A * | 3/1998 | Bro ............................ 600/545 |
| 5,727,128 | A | 3/1998 | Morrison |
| 5,774,883 | A | 6/1998 | Andersen et al. |
| 5,788,504 | A | 8/1998 | Rice et al. |
| 5,827,070 | A | 10/1998 | Kershaw et al. |
| 5,832,497 | A | 11/1998 | Taylor |
| 5,885,087 | A | 3/1999 | Thomas |
| 5,978,768 | A | 11/1999 | McGovern et al. |
| 5,980,096 | A * | 11/1999 | Thalhammer-Reyero .... 707/100 |
| 6,035,295 | A | 3/2000 | Klein |
| 6,056,556 | A | 5/2000 | Braun et al. |
| 6,070,143 | A | 5/2000 | Barney et al. |
| 6,086,382 | A | 7/2000 | Thomas |
| 6,115,646 | A | 9/2000 | Fiszman et al. |
| 6,126,448 | A | 10/2000 | Ho et al. |
| 6,144,838 | A | 11/2000 | Sheehan |
| 6,189,029 | B1 | 2/2001 | Feurst |
| 6,213,780 | B1 | 4/2001 | Ho et al. |
| 6,259,890 | B1 | 7/2001 | Driscoll et al. |
| 6,266,659 | B1 | 7/2001 | Nadkarni |
| 6,289,340 | B1 | 9/2001 | Puram et al. |
| 6,311,164 | B1 | 10/2001 | Ogden |
| 6,338,628 | B1 | 1/2002 | Smith |
| 6,341,267 | B1 | 1/2002 | Taub |
| 6,370,510 | B1 | 4/2002 | McGovern et al. |
| 6,385,620 | B1 | 5/2002 | Kurzius et al. |
| 6,442,370 | B1 | 8/2002 | Driscoll et al. |
| 6,466,914 | B1 | 10/2002 | Mitsuoka et al. |
| 6,484,010 | B1 | 11/2002 | Sheehan |
| 6,493,723 | B1 * | 12/2002 | Busche .................... 707/104.1 |
| 6,513,042 | B1 | 1/2003 | Anderson et al. |
| 6,514,079 | B1 | 2/2003 | McMenimen et al. |
| 6,514,084 | B1 | 2/2003 | Thomas |
| 6,524,109 | B1 | 2/2003 | Lacy et al. |
| 6,567,784 | B1 | 5/2003 | Bukow |
| 6,611,822 | B1 | 8/2003 | Beams et al. |
| 6,618,734 | B1 | 9/2003 | Williams et al. |
| 6,640,216 | B1 | 10/2003 | Loofbourrow et al. |
| 6,681,098 | B1 | 1/2004 | Pfenninger et al. |
| 6,691,122 | B1 | 2/2004 | Witte et al. |
| 6,735,570 | B1 | 5/2004 | Lacy et al. |
| 6,769,066 | B1 | 7/2004 | Botros et al. |
| 6,873,964 | B1 | 3/2005 | Williams et al. |
| 2001/0011280 | A1 | 8/2001 | Gilbert et al. |
| 2001/0031457 | A1 | 10/2001 | Pfenninger et al. |
| 2001/0042000 | A1 | 11/2001 | Defoor, Jr. |
| 2002/0019940 | A1 | 2/2002 | Matteson et al. |
| 2002/0042786 | A1 | 4/2002 | Scarborough et al. |
| 2002/0055866 | A1 | 5/2002 | Dewar |
| 2002/0128892 | A1 | 9/2002 | Farenden |
| 2002/0128893 | A1 | 9/2002 | Farenden |
| 2002/0128894 | A1 | 9/2002 | Farenden |
| 2002/0198766 | A1 | 12/2002 | Magrino et al. |
| 2003/0037032 | A1 | 2/2003 | Neece et al. |
| 2003/0101091 | A1 | 5/2003 | Levin et al. |
| 2003/0191680 | A1 | 10/2003 | Dewar |
| 2003/0195786 | A1 | 10/2003 | Dewar |
| 2003/0200136 | A1 | 10/2003 | Dewar |

OTHER PUBLICATIONS

Garson, *Neural Networks An Introductory Guide for Social Scientists*, SAGE Publications, pp. 1-194, 1998.

"NeuralWorks Professional II/PLUS," http://www.neuralware.com/products_pro2.jsp, pp. 1-3, Jul. 28, 2001.

"Statistica Neural Networks," http://www.statsoft.com/stat_nn.html, pp. 1-11, Jul. 28, 2001.

Scarborough, "Tutorial on the Use of Neural Network Models for Personal Selection," *Decision Sciences Institute Southwest Region Theory and Applications Proceedings 27th Annual Conference*, pp. 151-153, Mar. 6-9, 1996.

Marshall et al., "Neural Network Modeling of Risk Assessment in Child Protective Services," *Psychological Methods*, vol. 5, No. 1, pp. 102-124, 2000.

Aggarwal et al., "Selection of Surgical Residents: A Neural Network Approach," *Cybernetics and Systems: An International Journal*, vol. 31, pp. 417-430, 2000.

Collins et al., "An Application of the Theory of Neural Computation to the Prediction of Workplace Behavior: An Illustration and Assessment of Network Analysis," *Personnel Psychology*, vol. 46, pp. 503-524, 1993.

Mitchell, "How to Reduce the High Cost of Turnover," Lawson Software, pp. 1-11, Jul. 12, 2001, or before.

Page et al., "Panel: Strategic Directions in Simulation Research," *Proceedings of the 1999 Winter Simulation Conference*, pp. 1509-1520, 1999.

Mengel et al., "Using a Neural Network to Predict Student Responses," *ACM*, pp. 669-676, 1992.

Pentland et al., "Modeling and Prediction of Human Behavior," *M.I.T. Media Lab Perceptual Computing Technical Report*, No. 433, pp. 1-7, 1999.

Langley et al., "Applications of Machine Learning and Rule Induction," *Communications of the ACM*, vol. 38, No. 11, pp. 55-64, Nov. 1995.

"XpertRule® Miner, The Complete Data Mining Solution," http://www.attar.com/pages/info_xm/htm., pp. 1-5, Mar. 23, 2001.

"The Wide Scale Deployment of Active Data Mining Solutions," http://www.attar.com/tutor/deploy.htm, pp. 1-7, Mar. 23, 2001.

"A Hybrid GA-Heuristic Search Strategy," http://www.attar.com/pages/dev_gap.htm, pp. 1-6, Mar. 23, 2001.

Doyle et al., "Strategic Directions in Artificial Intelligence," *ACM Computing Surveys*, vol. 28, No. 4, pp. 653-670, Dec. 1996.

Callaghan, "Personalization on the Fly- SaffronOne, FrontMind Tap Advanced Technologies to Predict User Behavior, Make Recommendations," *eWeek*, p. 52, Oct. 23, 2000.

Hensher et al., "A Comparison of the Predictive Potential of Artificial Neural Networks and Nested Logit Models for Commuter Mode Choice," *Transportation Research Part E: Logistic and Transportation Review*, vol. 36, No. 3, pp. 155-172 (abstract only), Sep. 2000.

Kahney, "KnowledgeMiner 2 Digs Out More Info," *MacWEEK*, vol. 11, No. 40, pp. 23-24, Oct. 20, 1997.

Rosen, "Mining Database Treasures," *Computing Canada*, vol. 22, No. 20, pp. 42-43, Sep. 26, 1996.

McLeod et al., "Predicting Credit Risk: A Neural Network Approach," *Journal of Retail Banking*, vol. 15, No. 3, pp. 37-40, Fall 1993.

"SaffronOne's Unique Product Features," http://www.saffrontech.com/pages/products/features.html, pp. 1-2, Mar. 22, 2001.

Herschel et al., "CKOS and Knowledge Management: Exploring Opportunities for Using Information Exchange Protocols," *ACM*, pp. 42-50, 1999.

Hapgood, "Embedded Logic," http://www2.cio.com/archive/050100_revisit_content.html, pp. 1-3, Mar. 23, 2001.

Brachman et al., "Mining Business Databases," *Communications of the ACM*, vol. 39, No. 11, pp. 42-48, Nov. 1996.

Jordan et al., "Neural Networks," *The Computer Science and Engineering Handbook*, Tucker (ed.), pp. 536-556, 1996.

Scarborough, "An Evaluation of Backpropagation Neural Network Modeling as an Alternative Methodology for Criterion Validation of Employee Selection Testing," Doctoral Dissertation (*UMI Dissertation Services*), University of Texas, 1995.

Guion, "Personnel Assessment, Selection, and Placement," *Handbook of Industrial and Organizational Psychology*, Consulting Psychologists Press, Inc., pp. 327-397, 1991.

U.S. Appl. No. 60/211,044, filed Jun. 12, 2000, Dewar.

"123Assess™—Qualify Applicants in 10 Minutes!" TekMetrics, 1998, 1 page.

"The Science Behind Our Products—Profiles International, Inc.," Profiles International, Inc., website archived May 26, 2000, 2 pages.

"ASSESS Expert System/Bigby, Havis & Associates, Inc.," page archived from www.bigby.com website, 2 pages, May 7, 1999.

"assesspreview: ASSESS User Site Instructions," page archived from www.bigby.com website, 1 page, Oct. 12, 2000.

"assesspreview: History of ASSESS," page archived from www.bigby.com website, 1 page, Oct. 11, 1999.

"assesspreview: Welcome to the ASSESS Internet Online Preview," page archived from www.bigby.com website, 1 page, May 8, 1999.

"assesspreview: What is ASSESS?," page archived from www.bigby.com website, 1 page, Oct. 11, 1999.

"Custom Job Center," DecisionPoint Systems Hirelink Network advertisement, 2 pages, provided to potential customers by Decision Point Systems (predecessor company of Unicru, Inc.), before Jan. 2000.

"DDI Launches Tech Spin-Off Targeting Small to Mid-Size Businesses," AdvantageHiring.com, http://www.advantagehiring.com/about/pr_DDIspinoff.asp, 2 pages, Sep. 17, 1999.

"DecisionPoint Systems—Hiring Technology That Gives You A Competitive Advantage," DecisionPoint Systems HirePro™ advertisement, 2 pages, provided to potential customers by Decision Point Systems (predecessor company of Unicru, Inc.), before Jan. 2000.

"DecisionPoint Systems —Imagine Being Able to Incorporate Your Company's Job Application, Skills Test, Background Checks and Tax Credit Paperwork Into One Simple Process." DecisionPoint Systems advertisement, 4 pages, provided to potential customers by Decision Point Systems (predecessor company of Unicru, Inc.), before Jan. 2000.

"Facts About DDI: Who We Are, What We Do," Development Dimensions International, Inc., http://www.ddiworld.com/about/pr_facts. asp, 3 pages, website visited on Nov. 2, 2004.

"Highlights, The Bigby, Havis Newsletter: How Our Clients Use ASSESS," page archived from www.bigby.com website, 1 page, Oct. 8, 1999.

"HirePro.com—The Technology to Select The Ideal Employee Is Now Online," DecisionPoint Systems HirePro.com advertisement, 2 pages, provided to potential customers by Decision Point Systems (predecessor company of Unicru, Inc.), before Jan. 2000.

"HirePro™—Automated Hiring System," DecisionPoint Systems HirePro™ advertisement, 2 pages, provided to potential customers by Decision Point Systems (predecessor company of Unicru, Inc.), before Jan. 2000.

"HirePro™ Assessments—Application Assessment Tests for HirePro™," DecisionPoint Systems Assessment Series advertisement, 2 pages, provided to potential customers by Decision Point Systems (predecessor company of Unicru, Inc.), before Jan. 2000.

"HirePro™," DecisionPoint Systems HirePro™ advertisement, 1 page, provided to potential customers by Decision Point Systems (predecessor company of Unicru, Inc.), before Jan. 2000.

"HirePro™," Retail Direct Mail Piece, 6 pages, provided to potential customers by Decision Point Systems (predecessor company of Unicru, Inc.), before Jan. 2000.

"How Do You Stack Up Next to Training's New Guard?" http://web.archive.org/web/19991012021341/ddiworld.com/newguard/index.htm, Development Dimensions International, Inc., 4 pages, website archived Oct. 12, 1999.

"Nov. 18, 1997: More Firms Recruit Via the Internet," *The Boston Globe*, 2 pages, Nov. 14, 1997.

"Online Recruiting Strategist," Hunt-Scanlon.com, http://www.hunt-scanlon.com/newsarchives/orsarchives/2000/jan.htm, 8 pages, Jan. 2000.

"PR Newswire: TekMetrics Help EDS Select Top Sales Talent Online," http://www.google.com/search?hl=en&q=cache%3Awww.findarticles.com%2Fcf_dls%2Fm4PRN%2F1999_April_29%2F54502514%2Fpl%2Farticle.jhtml PR Newswire, Apr. 29, 1999.

"Profitability is Built Upon Teamwork," Decision Point Data (predecessor company of Unicru, Inc.), mailed to prospective customers, 6 pages, 1997.

"ReportView™—Closed Loop Reporting for HirePro™," DecisionPoint Systems ReportView™ advertisement, 4 pages, provided to potential customers by Decision Point Systems (predecessor company of Unicru, Inc.), before Jan. 2000.

"Saville & Holdsworth, Human Resource Consulting: ApView™ Net," page archived from www.shlusa.com website, 2 pages, Apr. 29, 1999.

"SHL Aspen Tree Software—Solutions for Employee Selection," page archived from www.aspentree.com website, 1 page, Dec. 1, 1998.

"SHL-HR Support Tools, Analytical Process, Decision-Support Tech," page archived from www.shlusa.com website, 1 page, Feb. 18, 1999.

"Solutions for Managers, Professionals and Supervisors," page archived from www.bigby.com website, 2 pages, Feb. 9, 1999.

Bylinsky, et al., "Computers That Learn by Doing," *Fortune*, vol. 128, Issue 5, p96, 5p, 14c, 7 pages, Sep. 6, 1993.

Glatzer, "Neural Networks Take on Real-World Problems," (Abstract) *Computer World*, v26, n32, p21(1), 1 page, Aug. 10, 1992.

Goodwin, "As Job Seekers Turn to Net," (Brief Article) *Computer Weekly*, p6(1), Feb. 4, 1999.

Lawton, "Genetic Algorithms for Schedule Optimization," (Cover Story) *AI Expert*, v7, n5, p22(6), 7 pages, May 1992.

Scarborough, "Decision Point Systems," Presentation to potential customer, 38 pages, ten or fewer copies left with potential customer, Wilsonville, Oregon, before Jun. 2000.

Scarborough, "*DPD*Neurotech™," Power Point Presentation given to prospective employer Decision Point Data (predecessor company of Unicru, Inc.) 32 pages, electronic copy provided to Decision Point Data., Dec. 1998.

Scarborough, "Welcome, Portland State University," Presentation to about 15 people, Portland, Oregon, 20 pages, before May 2000.

Schwartz, "Where Neural Networks are Already at Work: Putting AI to Work in the Markets," (Abstract) *Business Week*, n3291, p136(2), 1 page, Nov. 2, 1992.

Shannon, "A Mathematical Theory of Communication," Reprinted with corrections from *The Bell System Technical Journal*, vol. 27, pp. 379-423, 623-656, 55 pages, Jul., Oct. 1948.

"TekMetrics to Test Skills of Computer Sciences Corp. Job Candidates Over the Internet," *EDP Weekly's IT Monitor*, vol. 40, Issue 16, p. 6, Apr. 19, 1999.

Liang et al., "Theory and Methodology: Personnel Selection Using Fuzzy MCDM Algorithm," *European Journal of Operational Research*, vol. 78, pp. 22-33, 1994.

"Brainbench—The Skills Authority: Account Registration," www.brainbench.com website archived May 11, 2000, 2 pages.

"Brainbench—The Skills Authority: Looking for Qualified candidates?," www.brainbench.com website archived May 10, 2000, 1 page.

"Brainbench—The Skills Authority: Welcome to Brainbench," www.brainbench.com website archived May 11, 2000, 2 pages.

"Brainbench—The Skills Authority: About Our Assessments," www.brainbench.com website archived May 10, 2000, 2 pages.

"Brainbench—The Skills Authority: Brainbench Certifications™," www.brainbench.com website archived May 24, 2000, 2 pages.

"Are you ready to: Are you Ready?," www.brainbench.com website archived Mar. 2, 2000, 1 page.

"Top Ten Scores List," www.brainbench.com website archived Jul. 1, 2002, listing scores from Feb. 2000, 1 page.

"Brainbench—The Skills Authority: Frequently Asked Questions about Brainbench Certifications™," www.brainbench.com website archived May 10, 2000, 5 pages.

"Legal Considerations When Using Testing: White Paper," www.tekmetrics.com website archived Apr. 17, 1999, 3 pages.

"TekMetrics skills assessments & skills test & resume tracking: Frequently Asked Questions," www.tekmetrics.com website archived Apr. 24, 1999, 3 pages.

"Top 10 Test Scores Lists," www.tekmetrics.com website archived Dec. 5, 1998, 1 page.

"123Assess Demonstration," www.tekmetrics.com website archived Jan. 28, 1999, 2 pages.

"Catalog," www.tekmetrics.com website archived Dec. 6, 1998, 3 pages.

"Brainbench—The Skills Authority: Pricing," www.brainbench.com website archived May 10, 2000, 2 pages.

"Brainbench—The Skills Authority: Top Ten Scores List," www.brainbench.com website archived May 11, 2000, 1 page.

"Brainbench—The Skills Authority: See Where You Stand," www.brainbench.com website archived Apr. 19, 2000, 1 page.

"Brainbench—The Skills Authority: Dear Affiliate," www.brainbench.com website archived May 11, 2000, 3 pages.

"Brainbench—The Skills Authority: Sample Certificate," www.brainbench.com website archived May 11, 2000, 2 pages.

"Brainbench—The Skills Authority: Online Skills Assessment Leader Brainbench Forms Partnership With Leading Quality-Rating Services Provider," www.brainbench.com website archived Jun. 6, 2000, 2 pages.

"Brainbench—The Skills Authority: The Company," www.brainbench.com website archived May 11, 2000, 1 page.

"Brainbench—The Skills Authority: Hear What Our Customers Are Saying . . . ," www.brainbench.com website archived May 10, 2000, 6 pages.

"Brainbench—The Measure of Achievement: Mike Russiello," www.brainbench.com website archived May 1, 2003, 2 pages.

"Brainbench—The Measure of Achievement: Completed Assessment," www.brainbench.com website archived May 1, 2003, page.

"Brainbench—The Skills Authority: Privacy Policy," www.brainbench.com website archived May 10, 2000, 2 pages.

"Brainbench—The Skills Authority: Test Developer," www.brainbench.com website archived May 10, 2000, 2 pages.

"Brainbench—The Skills Authority: Test Alert," www.brainbench.com website archived Jun. 21, 2000, 2 pages.

"Brainbench—The Skills Authority: Online Cert Prep™," www.brainbench.com website archived Jun. 22, 2000, 2 pages.

"Brainbench—The Skills Authority: Take the Microsoft Challenge," www.brainbench.com website archived Mar. 3, 2000, 2 pages.

"Brainbench—The Skills Authority: Assessment Center Demonstration," www.brainbench.com website archived May 12, 2000, 2 pages.

"Brainbench—The Skills Authority: Online Public Transcript for Chastity Sterling," www.brainbench.com website archived May 11, 2003, 3 pages.

"Brainbench—The Skills Authority: Global E-Market Company for Skilled Services Team with World's Largest Online Certification Authority," www.brainbench.com website press release dated Feb. 1, 2000, 2 pages.

"Brainbench—The Skills Authority: Brainbench VP to Discuss Rapid Growth of Online Certification Industry," www.brainbench.com website press release dated May 2, 2000, 2 pages.

"Brainbench—The Skills Authority: Microsoft Chooses Brainbench Test to Prep the Market for Windows 2000," www.brainbench.com website press release dated Feb. 17, 2000, 2 pages.

"Brainbench—The Skills Authority: Brainbench to Develop/ Measure Talent for BTG To Staff Major Department of Education Project," www.brainbench.com website press release dated Feb. 11, 2000, 2 pages.

"Brainbench—The Skills Authority: FedSources, Inc. Teams Up with Brainbench for Online Skills Certification Service," www.brainbench.com website press release dated Oct. 22, 1999, 2 pages.

"Brainbench—The Skills Authority: EDS Targets Training with Brainbench Test!," www.brainbench.com website press release dated Mar. 11, 1999, 2 pages.

"Brainbench—The Skills Authority: Certifications Add Efficiency to the Employment Market," www.brainbench.com website white paper dated Jun. 7, 2000, 4 pages.

"Brainbench—The Measure of Achievement: A Skills-Based Employment Market," www.brainbench.com website white paper dated Jan. 24, 2000, 9 pages.

"Brainbench—The Measure of Achievement: The Rise of Online Certifications," www.brainbench.com website white paper dated Jan. 26, 2000, 8 pages.

"Brainbench—The Skills Authority: Data Warehousing Specialist Certification," www.brainbench.com website archived May 10, 2000, 2 pages.

"Brainbench—The Measure of Achievement: Javascript Certification," www.brainbench.com website archived Apr. 4, 2001, 3 pages.

"The Odd Friday Report: 1to1® Career Opportunities," Peppers and Rogers Group, www.1to1search.com, Feb. 11, 2000, 3 pages.

"An Applied Look at Reducing Adverse Impact by Differentially Weighting Selection Measures," SIOP 2000, 15th Annual Conference, Hyatt Regency, New Orleans, USA, 3 pages, Apr. 14, 2000.

"New Approaches to Combining Multiple Assessments for Predicting Criterion Outcomes," SIOP 2000, 15th Annual Conference, Hyatt Regency, New Orleans, USA, 2 pages, Apr. 14, 2000.

"Predicting Sales Success: An Examination of Alternative Predictors," SIOP 2000, 15th Annual Conference, Hyatt Regency, New Orleans, USA, 2 pages, Apr. 14, 2000.

"Automated Technologies for Biodata Prediction Systems," SIOP 2000, 15th Annual Conference, Hyatt Regency, New Orleans, USA, 2 pages, Apr. 15, 2000.

"Applying Neural Networking Techniques to Prediction Problems in I-O Psychology," SIOP 2000, 15th Annual Conference, Hyatt Regency, New Orleans, USA, 2 pages, Apr. 15, 2000.

"Self-Organizing Maps and Commitment Profiles," SIOP 2000, 15th Annual Conference, Hyatt Regency, New Orleans, USA, 2 pages, Apr. 15, 2000.

"Industry of Choice," Food Service Research Forum, 41 pages, Jan. 1997.

"Aspen Tree Software: The Total Solution to Employee Recruiting & Selection," Aspen Tree Software, Inc., Oct. 27, 1997, 29 pages.

"CAPS-A Total Solution for Off-Site Screening and Scheduling," Demo, Aspen Tree Software, Inc., Apr. 24, 1997, 20 pages.

"ApView Main Menu," Demo, Aspen Tree Software, Inc., Jun. 13, 1997, 30 pages.

"Interview Guide for Tom Horn,"Aspen Tree Software, Inc., Jun. 13, 1997, 17 pages.

Aspen Tree Software video (Length 13:44), Aspen Tree Software, Inc., Mar. 10, 1997, video file "ATS.avi" on CD #1.

Springboard video (Length 9:44), Aspen Tree Software, Inc., Apr. 30, 1998, video file "Coopers_Net.avi" on CD #1.

"All About ApView" video (Length 17:13), Aspen Tree Software, Inc., Mar. 7, 1997, video file "TRAINING.avi" on CD #1.

"1999 StoreWorks! Conference and Exhibition," Decision Point Data, Inc. (predecessor company of Unicru, Inc.), 13 pages, May 1999.

"A Technology Case Study for Human Resource Executive," Getting the High-Tech Hiring Edge, 2 pages, www.workindex.com/editorial/staff/sta0301.01.asp, Jan. 2003.

"Aspen Tree Software helps lessen resume overload," *PC Week*, vol. 14, No. 36, p. 84, ZDNet, Aug. 25, 1997.

"Assess v2—for Selection and Development," Bigby Havis & Associates, Inc., 5 pages, http://www.bigby.com/systesms/assessv2/System/main.asp, printed Aug. 5, 2005, showing applicants from 1998.

"Assess v.2: Technical Manual," Bigby Havis & Associates, Inc., 106 pages, Dec. 2003, describing products from 1970-2003.

"Before You Begin: Welcome to SSA Online Help," http://web.archive.org/web/19980118183643/http://www.coopersclub.com/inethlp2.Htm, 6 pages, 1998.

"Companies: Registration," www.epredix.com, 8 pages, archived Jun. 2000.

"Configuring Your Hardware and Browser," Virtual Learning Technologies, http://web.archive.org/web/19980524111629/http://www.proveit.com/browser.html, 2 pages, 1998.

"Customer Service and Clerical Potential Index™," candidate test, ePredix, Inc., 17 pages, Copyright 2001.

"Customer Service and Clerical Potential Index™," technical manual, ePredix, Inc., 91 pages, Copyright 2001.

"Example Campus Manager Process," Bigby Havis & Associates, Inc., 3 pages, Mar. 18, 1999.

"Get eCertified as a Java Programmer," http://www.tekmetrics.com, 1 page, Nov. 16, 2000.

"Getting Started: 1-2-3Assess," TekMetrics, Inc., www.tekmetrics.com, 3 pages, 1998.

"Guide to Using Assess Internet," Bigby Havis & Associates, Inc., 13 pages, Mar. 1999.

"Interactive Interview Category Analysis Report," DPD Applicant Report, Decision Point Data, Inc. (predecessor company of Unicru, Inc.), 1 page, Apr. 1998.

"Internet chats on line to replace paper CVS," UK: Launch of an Internet CV Package, *Retail Week*, p. 23 (1 page), Mar. 13, 1998.

"Invoice, Assess for Internet Units," Bigby Havis & Associates, Inc., 1 page, Feb. 16, 1999.

"Know It All—Staffing Professionals," Know It All, Inc., http://web.archive.org/web/19991009154935/www.knowitallinc.com/staffing.html, 1 page, 1999.

"Know It All—Technical Recruiters," Know It All, Inc., http://web.archive.org/web/19981206160646/www.knowitallinc.com/recruiter.html, 1 page, 1998.

"Know It All—Training Directors," Know It All, Inc., http://web.archive.org/web/19991009192333/www.knowitallinc.com/training.html, 1 page, 1999.

"Know It All, Inc.: About Us," Know It All, Inc., http://web.archive.org/web/19991109161725/www.knowitallinc.com/about.html, 1 page, 1999.

"Know It All, Inc.: Features and Benefits," Know It All, Inc., http://web.archive.org/web/19991110092810/www.knowitallinc.com/software.html, 2 pages, 1999.

"Management Information Packet for Customer Service and Sales Selection," Criterion International, Inc., 33 pages, May 12, 2000.

"More Firms Recruit Via the Internet," Boston Globe, 2 pages, Nov. 18, 1997.

"Process Complete: Assessment Results," TekMetrics, Inc., http://www.pvv.org/~kentda/cv/filer/ProgrammerAptitudeTest.html, 3 pages, 1999.

"Proposal to: [Customer Name Redacted]: for Selection System Development—Production and Operations Job Families," Proposal #P0317R00, Development Dimensions International, Inc., 27 pages, Submitted Sep. 30, 1998.

"Proposal to: Client Name: Web-Screen Proposal," Development Dimensions International, Inc., 19 pages, 1999.

"Prove It! Demonstration Test: Welcome to Prove It!," Virtual Learning Technologies, http://web.archive.org/web/19990508182217/www.proveit.com/demo.shtml, 6 pages, 1999.

"Prove It! Features and Benefits," Know It All, Inc., http://web.archive.org/web/19991009032643/www.knowitallinc.com/features.html, 2 pages, 1999.

"Prove It! Features and Benefits: Internet and Intranet Solutions," Know It All, Inc., http://web.archive.org/web/19991110011034/www.knowitallinc.com/network.html, 2 pages, 1999.

"Prove It! Results Page," Know It All, Inc., http://web.archive.org/web/19991009121500/www.knowitallinc.com/results.html, 2 pages, 1999.

"Prove It!," Virtual Learning Technologies, http://web.archive.org/web/19980524111918/http://www.proveit.com/index.html, 2 pages, 1998.

"proveit.com Features and Advantages," Virtual Learning Technologies, http://web.archive.org/web/19990508184214/www.proveit.com/features.html, 1 page, 1998.

"Psychology Technology Design: SOLUTIONS for Selection and Development," SHRM Conference flyer, Bigby Havis & Associates, Inc., 2 pages, Jun. 1998.

"QWIZ—The Standard for Testing and Training," QWIZ, Inc., http://web.archive.org/web/19990218064159/www.qwiz.com/main.htm, 1 page, 1999.

"QWIZtek Remote Demo," http://www.archive.org/web/19981205104155/208.147.160.198/welcome.asp , 2 pages, 1998.

"QWIZtek™ Technical Skills Testing Software," http://web.archive.org/web/19981205232749/www.qwiz.com/qwiz_tek.cfm, 2 pages, 1998.

"Spherion, ExxonMobil expand employee-screening agreement," Industry News, 2 pages, www.petroretail.net/npn/2001/0201/0201msin.asp, Feb. 2001.

"TechTests Product Line," Virtual Learning Technologies, http://web.archive.org/web/19980524111739/http://www.proveit.com/products.html, 3 pages, 1998.

"TeckChek—IT Skills Testing—Logistics and Scoring," Bookman Testing Services, Inc., http://web.archive.org/web/20000823160658/www.teckchek.com/services/logistics.html, 1 page, 2000.

"TeckChek Apr. 1999 Newsletter," Bookman Testing Services, Inc., http://web.archive.org/web/19991022004537/www.teckchek.com/home/newsletter0499.html, 3 pages, Apr. 1999.

"TekMetrics E-Certifications(TM) Offered On www.CareerBuilder.com," PR Newswire, p. 9882 (2 pages), Mar. 22, 1999.

"The ASSESS System: An Assessment Tool for Consulting to Business," Professional Users Training Conference brochure, 2 pages, Jul. 22-24, 1999 and Oct. 7-9, 1999.

"The Candidate Profile Record," brochure, Richardson, Bellows, Henry & Co., Inc., 21 pages, Copyright 1982, 1983, 1989.

"The Candidate Profile Record," Richardson, Bellows, Henry & Co., Inc., 95 pages, at least as early as 1995.

"The Manager Profile Record," Richardson, Bellows, Henry & Co., Inc., 48 pages, at least as early as 1992.

"The Supervisory Profile Record," technical report, Richardson, Bellows, Henry & Co., Inc., 192 pages, at least as early as 1992.

"Unicru—History," http://www.unicru.com/about/history.aspx, 3 pages, website visited on Sep. 23, 2005, 3 pages, recounting events from 1987-2005.

"Welcome to C&L Springboard: Welcome to SSA Online," http://web.archive.org/web/19980118183630/www.coopersclub.com/Screen1.htm, 2 pages, 1998.

"What's New at TeckChek in IT Adaptive Test Assessment," Bookman Testing Services, Inc., http://web.archive.org/web/19990422225528/www.teckchek.com/home/whatsnew.html, 1 page, 1999.

Ben-David, et al., "On the Architecture and Implementation of Parallel Ordinal Machines," IEEE Transactions on Systems, Man and Cybernetics, vol. 25, No. 1, pp. 159-168, Jan. 1995.

Brooks, "Internet Assessment: Opportunities and Challenges," Paper presented to The 24th Annual IPMAAC Conference on Personnel Selection, ePredix, Inc., 6 pages, Jun. 4, 2000.

Clainos, "Tools & Technology," International Mass Retail Association, 1999 Store Operations & Human Resources Conference, Decision Point Data, Inc. (predecessor company of Unicru, Inc.), 28 pages, Feb. 2, 1999.

Emrich, "The Many Advantages of Using IPS Diagnostic Software," Science Curriculum Inc., H.C. Crittenden Middle School, Armonk, New York; 2 pages, www.sci-ips.com/ips.diagnostic_advantages.html, archived at least as early as Mar. 5, 2001.

Gormley, "Personality Testing," Google Groups: alt.psychology, http://groups.google.com/group/sci.psychology.personality/browse_thread/thread/6ae48d82d3d2b686/32f49b703260c483?q=personality+testing&rnum=18&hl=en#32f49b703260c483, 3 pages, Jul. 21, 1998.

Jacobs, "Minimizing Risk: Hiring in the 21st Century," www.shlusa.com, Presentation to the International Personnel Management Association Assessment Counsel, SHL North America, 42 pages, Jun. 7, 2000.

Kaak, "The Weighted Application Blank," Cornell Hotel and Restaurant Administration Quarterly, vol. 39, No. 2, 7 pages, Apr. 1998.

Lake, "Web-based Skill Testing for Computer Professionals," Computing, vol. 6, No. 5, pp. 30-32, 1998.

McCune, "A Few Good Employees (Screening and Evaluating Software for Employee Recruitment)," Management Review, vol. 87, No. 4, p. 38 (5 pages), Apr. 1998.

Mondragon et al., "Implementing Web-Based HR Systems: From Recruitment to Surveys and Beyond," SIOP 2000 Workshop 5, http://www.siop.org/Conferences/00Con/Workshops/workshop5.htm, 2 pages, 2000.

Ntuen, et al., "An Expert System for Selecting Manufacturing Workers for Training," Expert Systems with Applications, vol. 9, No. 3, pp. 309-332, Copyright 1995.

Oliver, "Slouches Make Better Operators (Aspen Tree Software Designs Personnel Questionnaire and Productivity Measurement Software)," Forbes, vol. 152, No. 4, p. 104 (4 pages), Aug. 6, 1993.

Rubinstein, "Operators Embrace Automated Systems to Hire the Best, Reduce Turnover," Nation's Restaurant News, New York, vol. 31, Issue 25, pp. 71-72 (4 pages), Jun. 23, 1997.

Russiello, "Online Certifications (FREE)," CTS News Archives: wu.jobs—#202, 2 pages, Jan. 13, 1999.

Schmidt, "Exploring the Boundary Conditions for Interview Validity: Meta-Analytic Validity Findings for a New Interview Type," Summer 1999, Personnel Psychology, vol. 52, No. 2, pp. 445-464 (20 pages).

Silberberg, et al., "The NASA Personnel Security Processing Expert System," National Conference on Artificial Intelligence Proceedings (AAAI), pp. 1527-1532, Aug. 4-8, 1996.

U.S. Dept. of Labor, Code of Federal Regulations Pertaining to U.S. Department of Labor—Uniform Guidelines on Employee Selection Procedures, (CFR, Title 41, Chapter 60, Part 60-3), 52 pages, www.dol.gov/dol/allcfr/Title_41/Part_60-3/toc.htm, 1978.

Chang et al., "The Development of a Computer-Based Decision Support System for Use in Evaluating Candidates for the Position of Programmer-Analyst," ACM SIGCPR Computer Personnel, vol. 13. Issue 1, pp. 9-19, Apr. 1991.

Doung et al., "A System of IAC Neural Networks as the Basis for Self-Organization in a Sociological Dynamical System Simulation," Behavioral Science, vol. 40, pp. 275-303, 1995.

Franklin, Dianna, "An Effective Way to Hire Technical Staff," User Services Conference: Proceedings of the 14th Annual ACM SIGUCCS Conference on User Services: Setting the Direction, pp. 137-142, 1986.

Labate et al., "Employee Skills Analysis Using a Hybrid Neural Network and Expert System," IEEE International Conference on Developing and Managing Intelligent System Projects, pp. 205-211, Mar. 1993.

Lim et al., "A Method for (Recruiting) Methods: Facilitating Human Factors Input to System Design," Conference on Human Factors in Computing Systems, Proceedings of the SIGCHI Conference on Human Factors in Computing Systems, pp. 549-556, 1992.

Walczak, "Categorizing University Students Applicants with Neural Networks," IEEE International Conference on Neural Networks, IEEE World Congress on Computational Intelligence, vol. 6, pp. 3680-3685, 1994.

Somers, M.J., "Application of two neural network paradigms to the study of voluntary employee turnover," *Journal of Applied Psychology,* 84, 177-185 (1999).

Kemp, "Knowledge-based Simulation for Teaching," Proceedings of the 1st New Zealand International Stream Conference on Artificial Neural Networks and Expert Systems; pp. 192-195, Nov. 1993.

Kirby et al., "An Analysis of Applying Artificial Neural Networks for Empoyee Selection, " Americas Conference on Information Systems, 4 pages, 1998.

Walczak, "Neural Network Models for a Resource Allocation Problem," IEEE Transactions on Systems, Man, and Cybernetics - Part B: Cybernetics, vol. 28, No. 2, pp. 276-284, Apr. 1998.

* cited by examiner

PRIOR ART

ELECTRONIC EMPLOYEE SELECTION SYSTEMS AND METHODS

RELATED APPLICATION DATA

This application claims the benefit of Becker et al., U.S. Provisional Patent Application No. 60/223,289, "Automated electronic employee selection process and hiring recommendation system using on-line criterion validation data collection, artificial intelligence-enabled adaptive learning and electronic results reporting," filed Aug. 3, 2000.

TECHNICAL FIELD

The invention relates to automated employee selection.

COPYRIGHT AUTHORIZATION

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Organizations can spend considerable time and effort identifying and hiring suitable employees. Good help is hard to find. Despite their best efforts, organizations still often meet with failure and simply accept high turnover and poor employee performance.

A variety of approaches to finding and hiring employees have been tried. A well-known tool for employee selection is the job application. Job applications help identify a job applicant's qualifications, such as educational background, job history, skills, and experience.

An employer typically collects a set of job applications from applicants who drop by an employer work site or appear at a job fair. Someone in the organization then reviews the applications to determine which applicants merit further investigation. Then, a job interview, a test, or some other review process is sometimes used to further limit the applicant pool.

With the advent of the electronic age, job applications can be completed electronically. In this way, the delays associated with processing paper can be minimized. However, even electronically-completed job applications can be of questionable merit and still require considerable effort on the part of the hiring organization to review them. A better way of selecting employees is still needed.

SUMMARY

Large organizations can bring considerable resources to bear on the task of developing a job application. For example, a large retail chain might consult with an industrial psychologist to study the job environment and develop a set of questions that ostensibly predict whether an individual will excel in the environment.

However, such an approach is fraught with inaccuracy and subjectivity; further, the psychologist's analysis depends on conditions that may change over time. For example, even if the psychologist identifies appropriate factors for testing, an applicant might slant answers on the application based on what the applicant perceives is expected. Further, two psychologists might come up with two completely different sets of factors. And, finally, as the job conditions and applicant pool changes over time, the factors may become less effective or ineffective.

To determine whether a job application is effective, a study can be conducted to verify whether the factors chosen by the psychologist have been successful in identifying suitable applicants. However, such a study requires even more effort in addition to the considerable effort already invested in developing the application. So, such a study typically is not conducted until managers in the organization already know that the application is ineffective or out of date.

The disclosed embodiments include various systems and methods related to automated employee selection. For example, various techniques can be used to automate the job application and employee selection process.

In one aspect of an embodiment, answers to job application questions can be collected directly from the applicant via an electronic device. Based on correlations of the answers with answers to questions by other individuals for which post-hire information has been collected, a post-hire outcome is predicted.

In another aspect of an embodiment, an artificial-intelligence technique is used. For example, a neural network or a fuzzy logic system can be used to build a model that predicts a post-hire outcome. Proposed models of different types can be constructed and tested to identify a superior model.

When constructing a model, an information-theory-based feature selection technique can be used to reduce the number of inputs, thereby facilitating more efficient model construction.

Items identified as ineffective predictors can be removed from the job application. Information collected based on the new job application can be used to build a refined model. In this way, a system can exhibit adaptive learning and maintain its effectiveness even if conditions change over time. Content can be rotated or otherwise modified so the job application changes and maintains its effectiveness over time. Evolution toward higher predictive accuracy for employee selection can be achieved.

A sample size monitor can identify when sufficient information has been collected electronically to build a refined model. In this way, short-cycle criterion validation and performance-driven item rotation can be supported.

Outcomes can be predicted for any of a wide variety of parameters and be provided in various formats. For example, tenure, number of accidents, sales level, whether the employee will be involuntarily terminated, whether the employee will be eligible for rehire upon termination and other measures of employee effectiveness can be predicted. The prediction can be provided in a variety of forms, such as, for example, in the form of a predicted value, a predicted rank, a predicted range, or a predicted probability that an individual will belong to a group.

Predictions can be provided by electronic means. For example, upon analysis of a job applicant's answers, an email or fax can be sent to a hiring manager indicating a favorable recommendation regarding the applicant. In this way, real-time processing of a job application to provide a recommendation can be supported.

Information from various predictors can be combined to provide a particularly effective prediction. For example, a prediction can be based at least on whether (or the likelihood) the applicant will be involuntarily terminated and whether (or the likelihood) the applicant will be eligible for rehire upon termination. Based on whether the individual is predicted to both voluntarily quit and be eligible for rehire upon termination, an accurate measure of the predicted suitability of an applicant can be provided.

Post-hire information can be based on payroll information. For example, termination status and eligibility for rehire information can be identified by examining payroll records. The payroll information can be provided electronically to facilitate a high-level of accurate post-hire information collection.

Further, reports can be provided to indicate a wide-variety of parameters, such as applicant flow, effectiveness of the system, and others.

Although the described technologies can continue to use the services of an industrial psychologist, relationships between pre-hire data predictors and desired job performance criteria can be discovered and used without regard to whether the psychologist would predict such a relationship. A system using the described technologies can find relationships in data that may elude a human researcher.

Additional features and advantages of the various embodiments will be made apparent from the following detailed description of illustrated embodiments, which proceeds with reference to the accompanying drawings.

The present invention includes all novel and nonobvious features, method steps, and acts alone and in various combinations and sub-combinations with one another as set forth in the claims below. The present invention is not limited to a particular combination or sub-combination.

DETAILED DESCRIPTION

Overview of the Technologies

On a general level, the described technologies can include collecting information and building a model based on the information. Such a model can then be used to generate a prediction for one or more desired job performance-related criteria. The prediction can be the basis of a hiring recommendation or other employee selection information.

Figure 1:
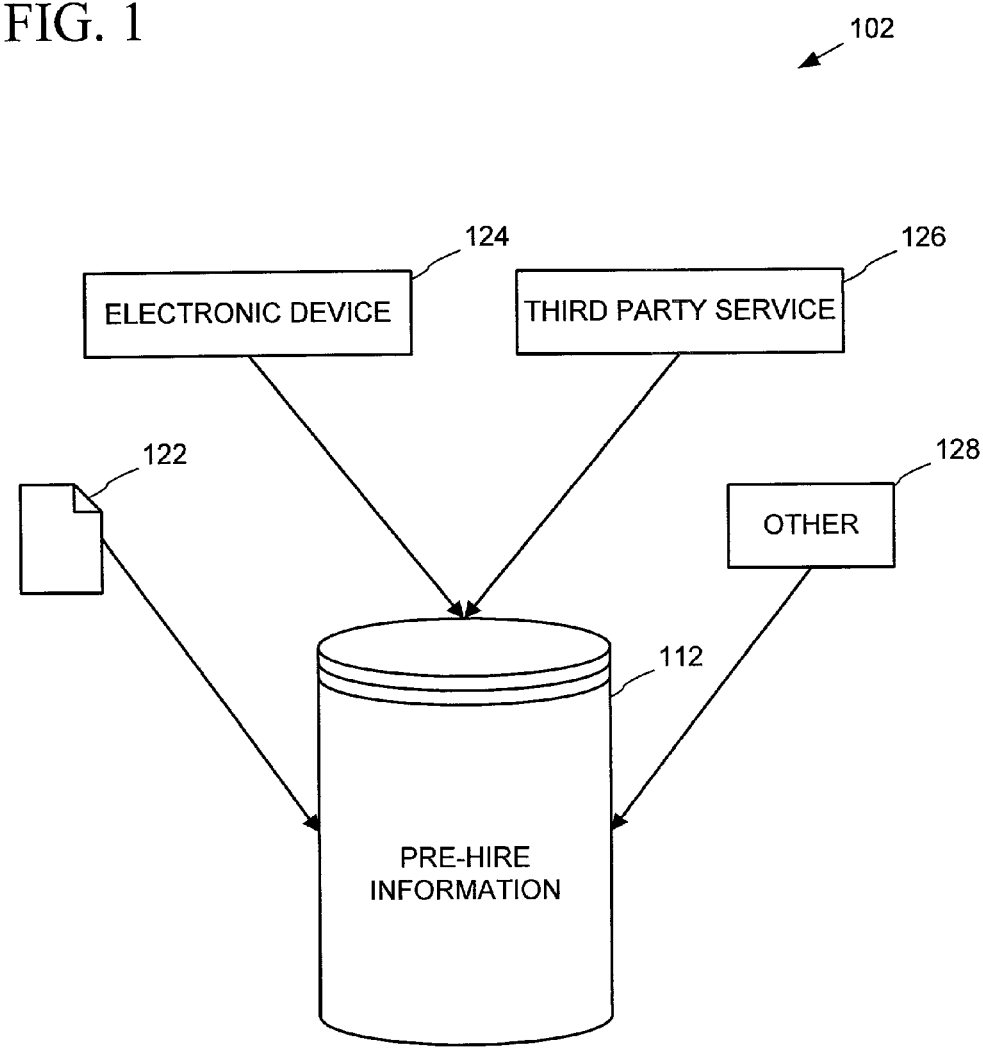
FIG. 1 is a block diagram showing exemplary pre-hire information collection.

Pre-hire information includes any information collected about an individual before the individual (e.g., a job applicant or other candidate) is hired. FIG. 1 shows a variety of sources 102 for collecting pre-hire information 112. The pre-hire information 112 can be stored in electronic (e.g., digital) form in a computer-readable medium (e.g., RAM, ROM, magnetic disk, CD-ROM, CD-R, DVD-ROM, and the like). Possible sources for pre-hire information 112 include a paper-based source 122, an electronic device 124, a third party service 126, or some other source 128. For example, pre-hire information can include an applicant's answers to an on-line employment application collected at a remote site, such as at an electronic device located in a kiosk at a prospective employer's work site. Further information and examples are described in "Example 2—Collecting Information," below.

Post-hire information includes any information collected about an individual (e.g., an employee) after the individual is hired, including information collected while the employee is employed or after an employee is fired, laid off, or quits. Post-hire information can similarly be collected from a wide variety of sources. Post-hire information can include information about the employee's termination date. Further examples are described in "Example 2—Collecting Information," below.

Figure 2:
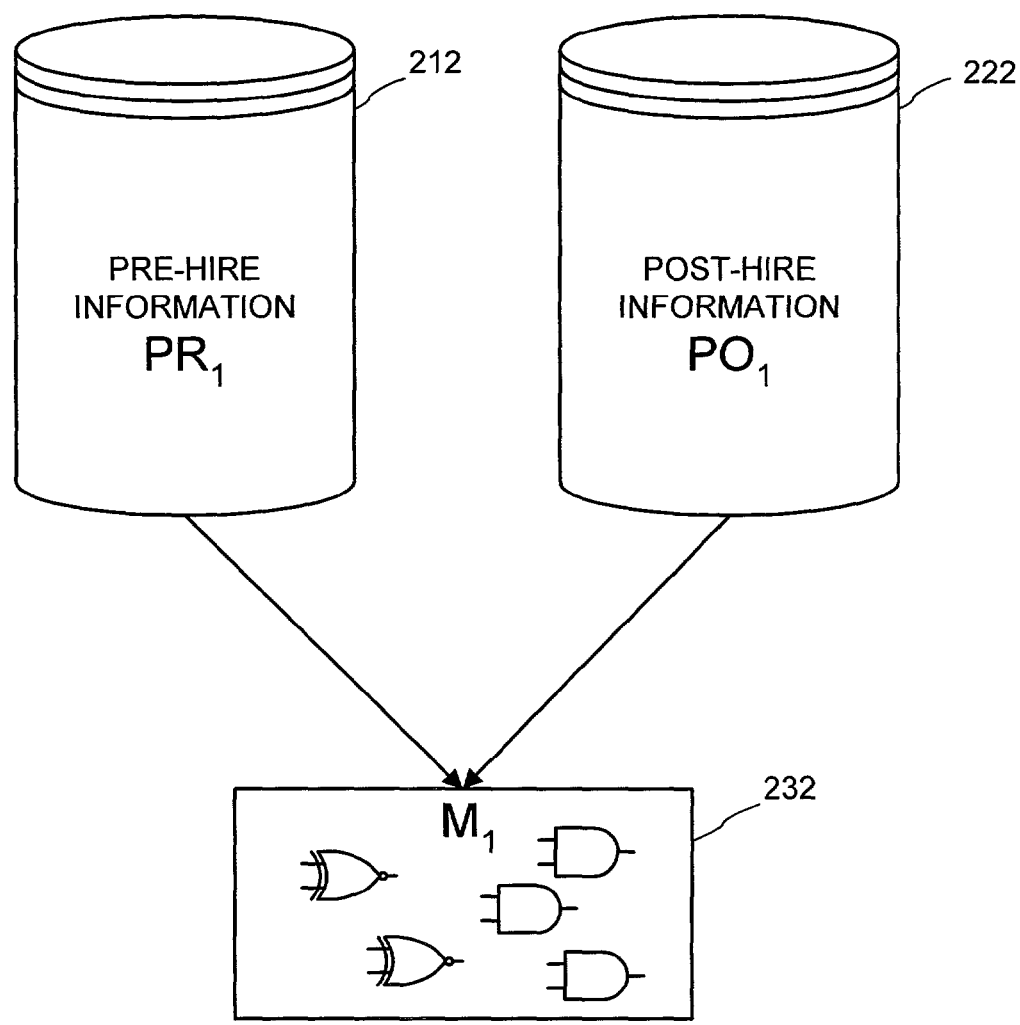
FIG. 2 is a block diagram showing a predictive model based on pre-hire and post-hire information.

As shown in FIG. 2, after pre-hire information 212 and post-hire information 222 have been collected, a predictive model 232 can be built. As described in more detail below, a predictive model 232 can take a variety of forms, including artificial intelligence-based models. The predictive model can generate one or more predictions based on pre-hire information inputs. Thus, the model can be used to generate predictions for job applicants. In practice, the model can be implemented as computer-executable code stored in a computer-readable medium.

Figure 3:
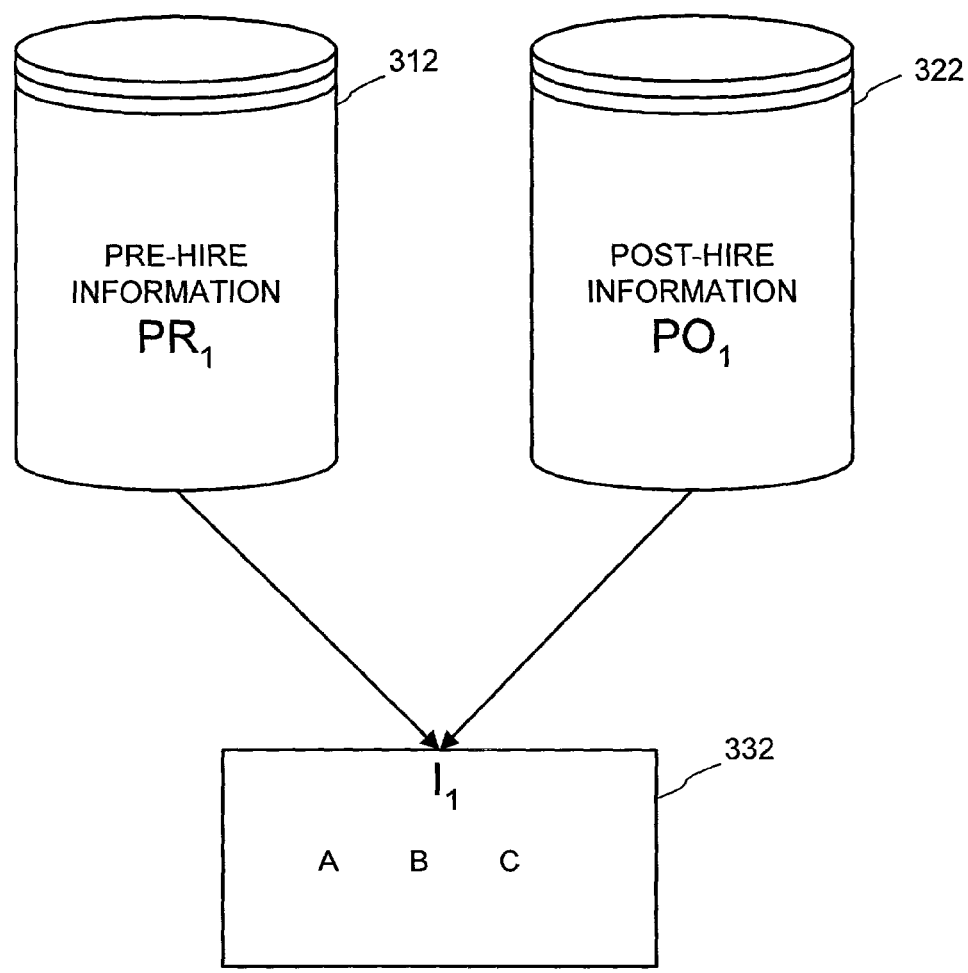
FIG. 3 is a block diagram showing ineffective predictors based on pre-hire and post-hire information.

As shown in FIG. 3, after pre-hire information 312 and post-hire information 322 have been collected, ineffective predictors 332 can be identified. Such ineffective predictors can be ignored when constructing a model (e.g., the model 232 of FIG. 2). In this way, the complexity of the model can be reduced, and the efficiency of the model construction process can be improved.

Further, the same ineffective predictors 332 or similar ineffective predictors can be removed from pre-hire content (e.g., ineffective questions can be removed from a job application). Identification of ineffective predictors can be achieved via software using a variety of techniques; examples are described below.

Figure 4:
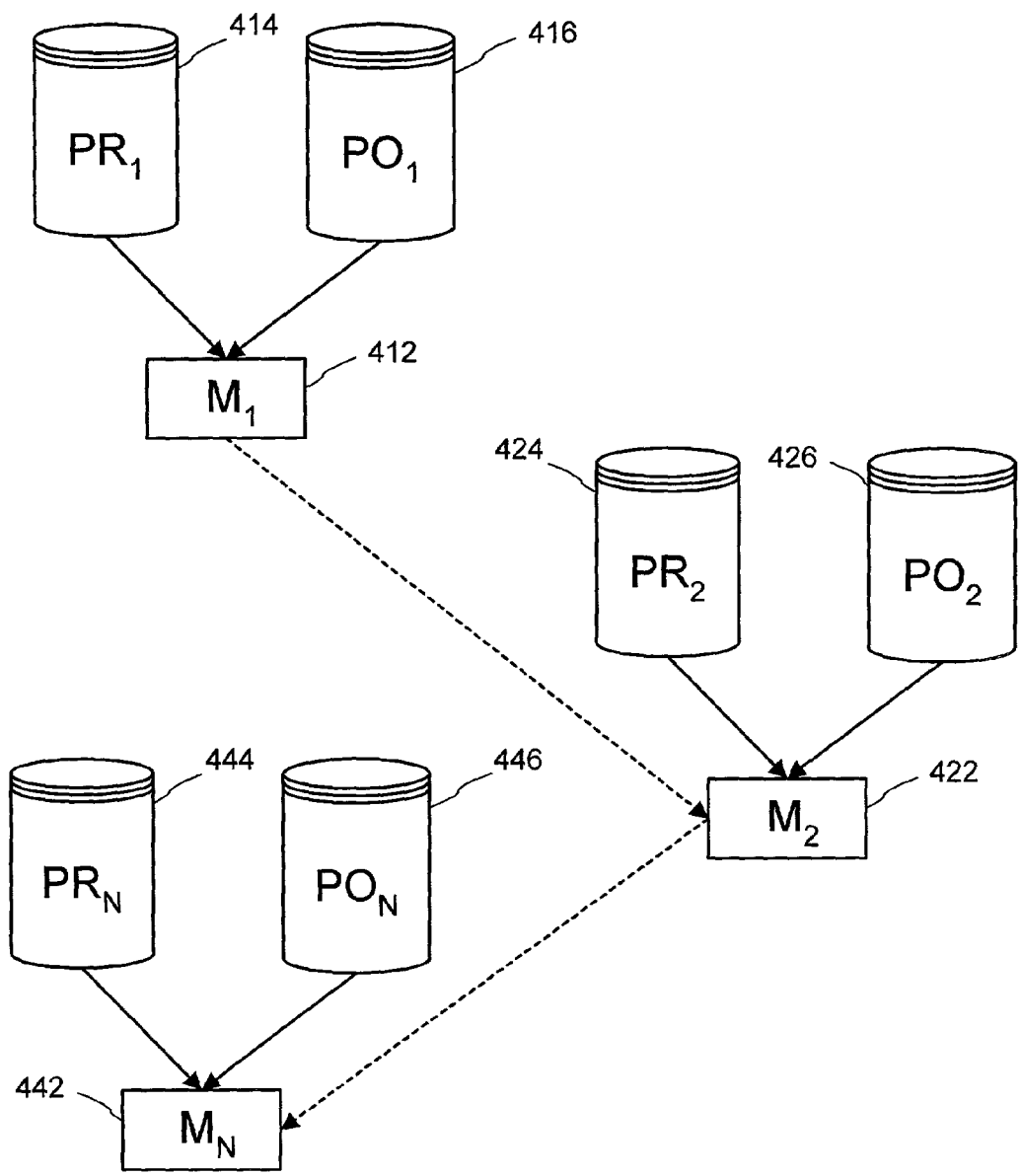
FIG. 4 is a block diagram showing refinement of a model over time.

As shown in FIG. 4, using various features described herein, a predictive model $M_1$ (412) based on pre-hire information $PR_1$ (414) and post-hire information $PO_1$ (416) can be refined. For example, information collection techniques can be refined by removing pre-hire content identified as ineffective. Further, additional pre-hire content might be added (e.g., a new set of questions can be added to a job application).

As a result, new pre-hire information $PR_2$ (424) based on the refined pre-hire content can be collected. Corresponding post-hire information $PO_2$ (426) can be collected. Based on the information, a refined model $M_2$ (422) can be constructed.

The refinement process can be continued. For example, the effectiveness of the additional pre-hire content can be determined. Thus, refinement can continue a number of times over time, resulting in pre-hire information $PR_n$ (444), post-hire information $PO_n$ (446), and a refined model $M_n$ (442).

Figure 5:
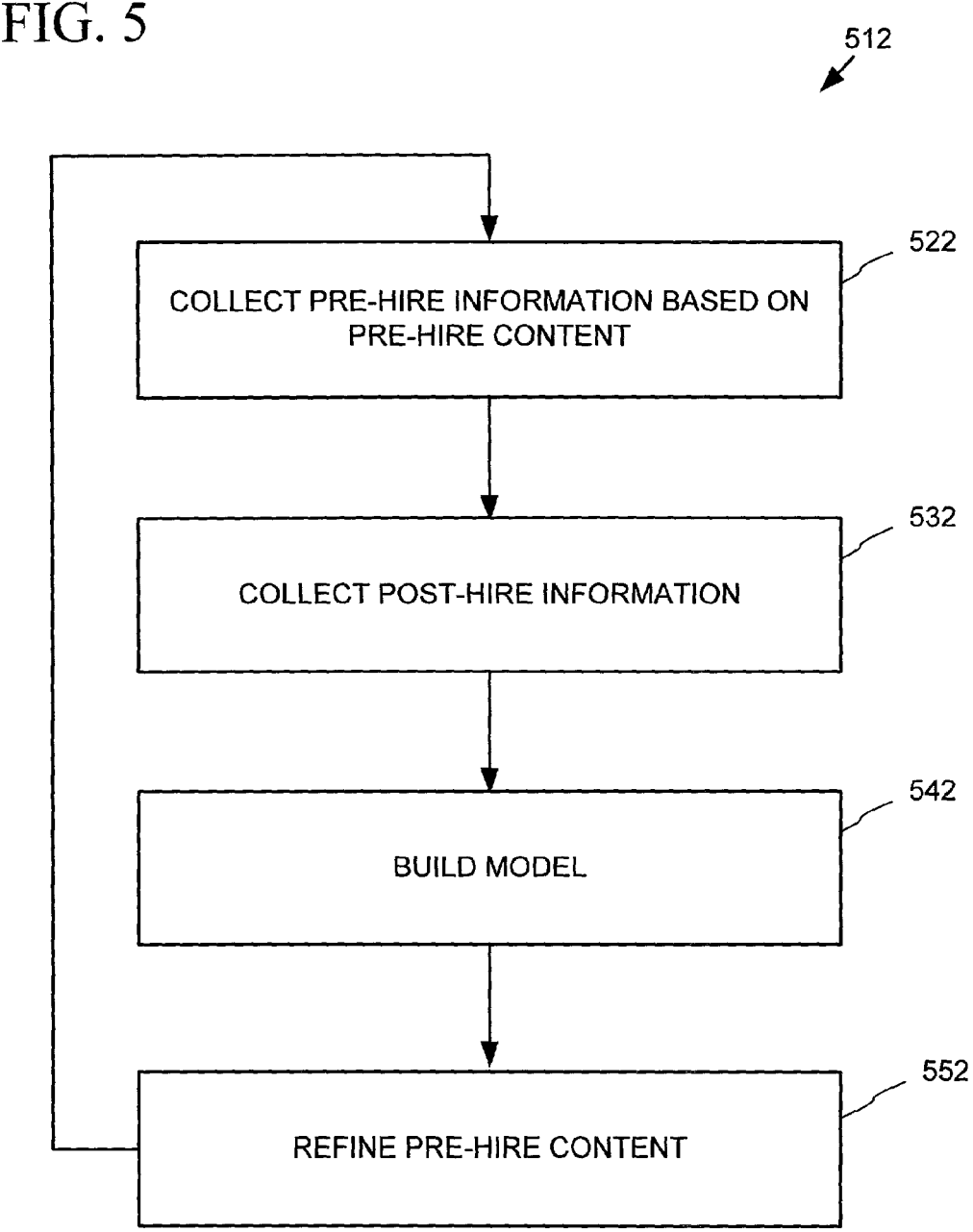
FIG. 5 is a flowchart showing a method for refining a model over time.

FIG. 5 shows an exemplary method for refining a predictive model. At 522, pre-hire information for applicants is collected based on pre-hire content (e.g., predictors such as questions on an employment application or predictors collected from other sources). At 532, post-hire information for the applicants is collected. At 542 a predictive model is constructed. The model can be deployed and model output used for hiring recommendations. At 552, the pre-hire content can be refined (e.g., one or more ineffective questions can be removed and one or new ones can be added). Then, additional pre-hire information can be collected at 522 (e.g., based on the refined pre-hire content). Eventually, a refined model can be generated.

Figure 6:
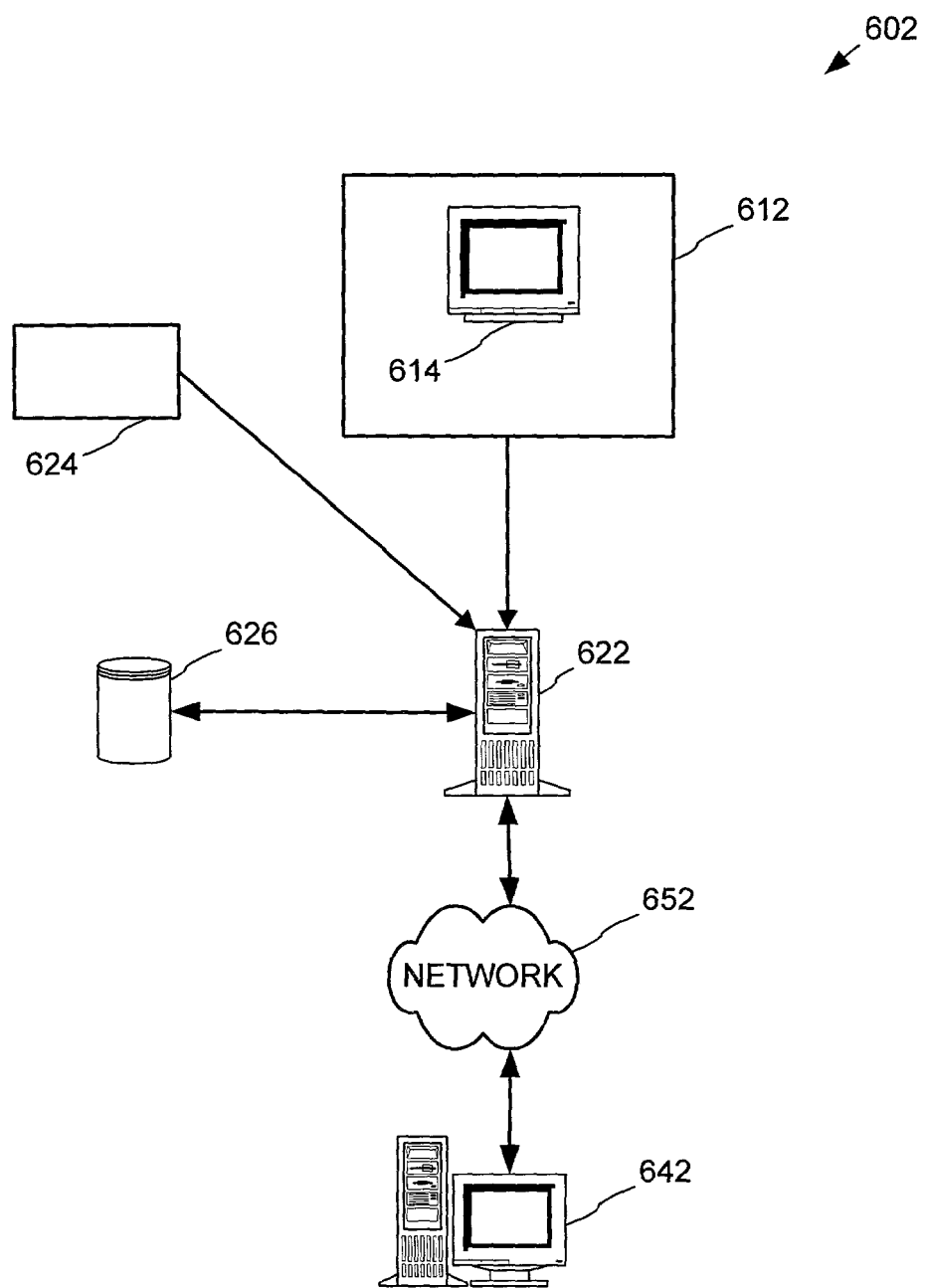
FIG. 6 is a block diagram showing an exemplary system for providing employee suitability recommendations.

The various models shown can be used as a basis for providing employee hiring recommendations. The architecture used to implement an electronic system providing such employee hiring recommendations can vary from simple to complex. FIG. 6 shows an overview of an exemplary system 602. In the example, a computer-based electronic device 612 housed in a kiosk is situated in a work site (e.g., a retail store) and presents a job application to a job applicant via an electronic display 614. The electronic device then sends the applicant's answers to a central server 622, which can also receive information from other electronic devices, such as the electronic device 624.

The server 622 can save the answers to a database 626 and immediately apply a predictive model to the answers to generate one or more predictions of employment performance for the applicant and a hiring recommendation based on the predictions. Thus, real-time processing of incoming data can be accomplished.

The hiring recommendation can be immediately sent to a hiring manager's computer 642 via a network 652 (e.g., in an email via the Internet). Thus, real-time reporting based on incoming data can be accomplished. Although often less desirable, delayed processing is also possible. Thus, alternatively, the system can, for example, queue information and send it out in batches (e.g., in a set of n applicants or every n days) as desired.

Various combinations and sub-combinations of the techniques below can be applied to any of the above examples.

EXAMPLE 1

Exemplary System and Method

Figure 7:
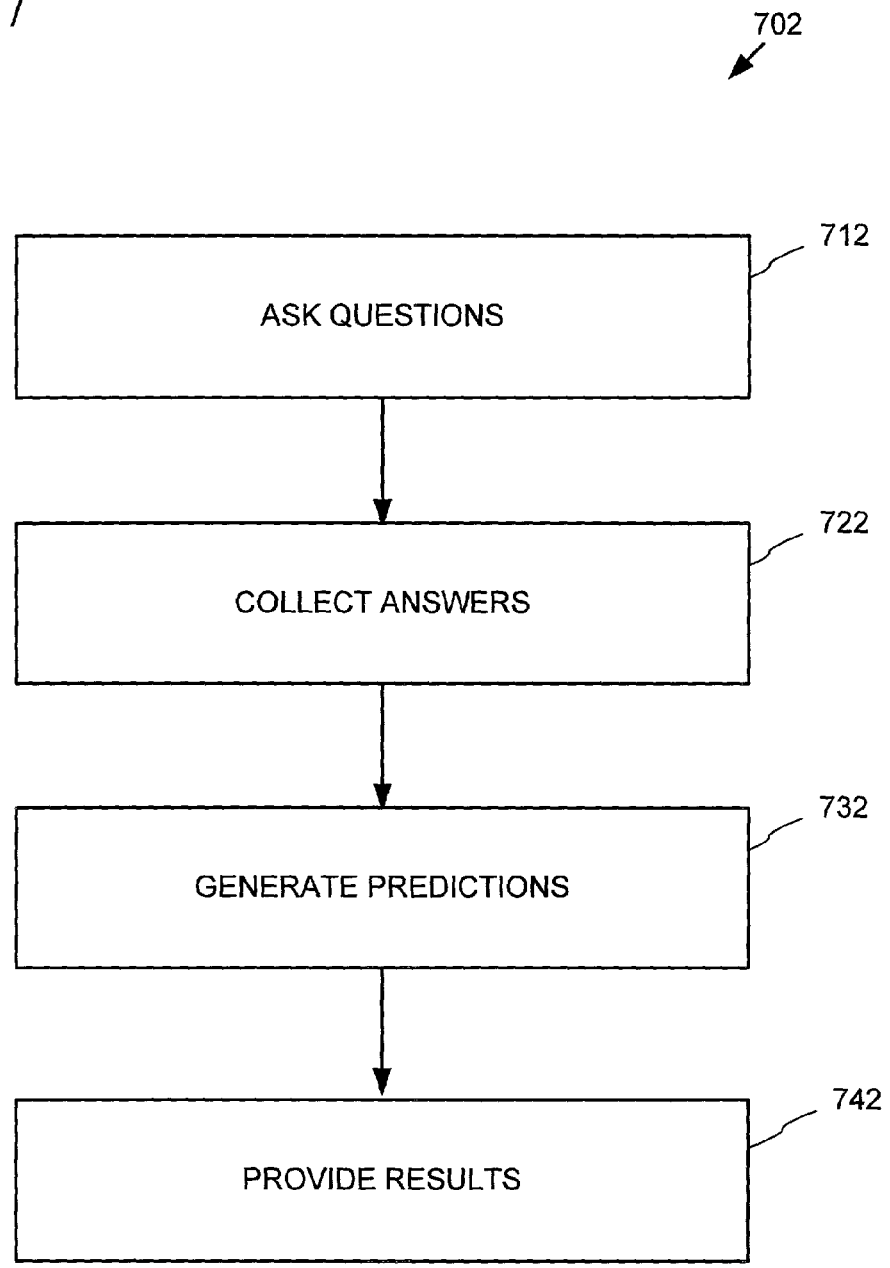
FIG. 7 is a flowchart illustrating an exemplary method for providing employee suitability recommendations.

FIG. 7 is a flowchart showing an exemplary method 702 for providing automated employee selection. At 712, questions are asked of an applicant such as via an electronic device. The answers are collected at 722. Based on the answers, a prediction is generated at 732. Then, the results are provided at 742.

Figure 8:
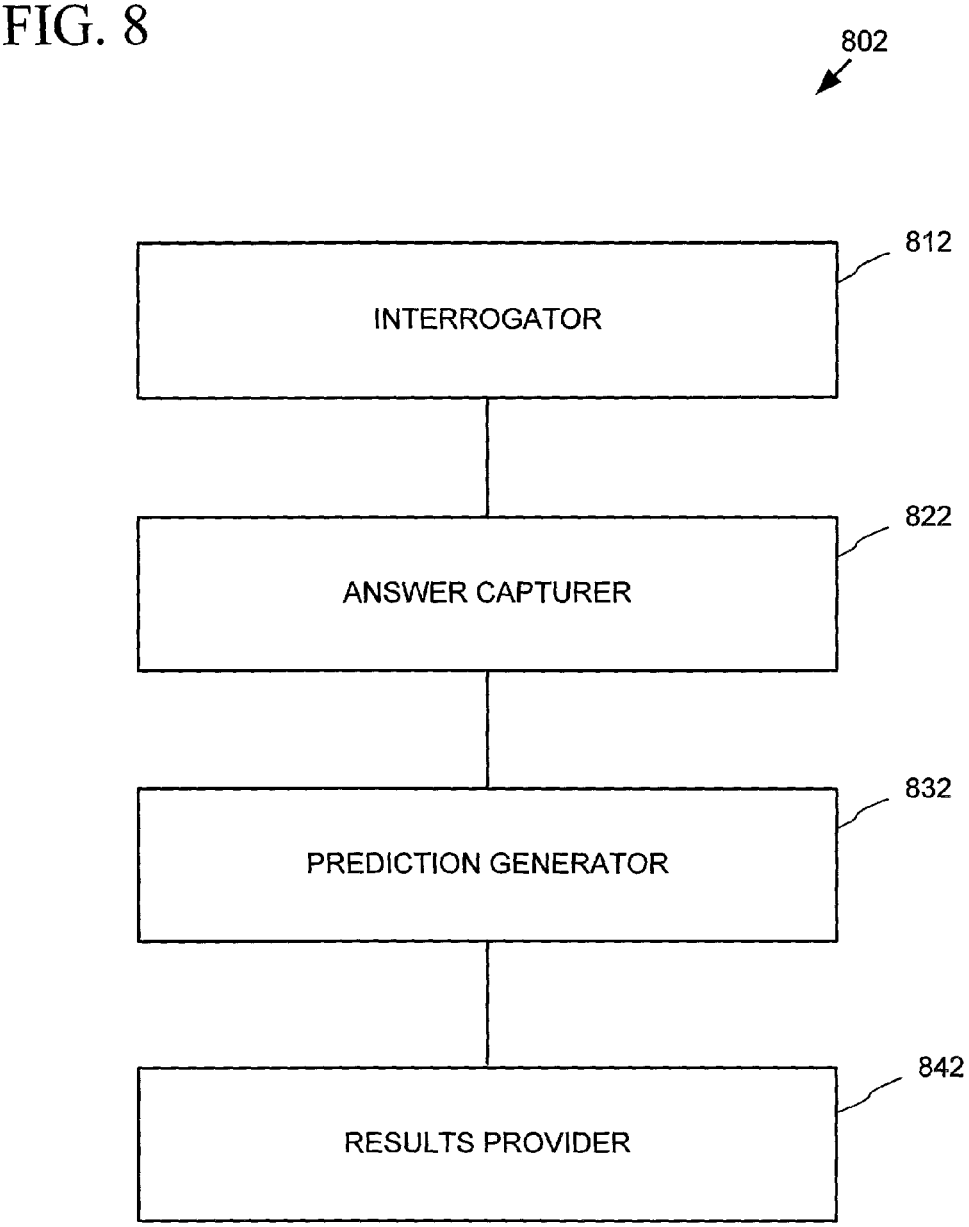
FIG. 8 is a block diagram illustrating an exemplary architecture for providing employee suitability recommendations.

FIG. 8 is a block diagram an exemplary system 802 for providing employee selection. An electronic data interrogator 812 is operable to present a first set of a plurality of questions to an individual. An electronic answer capturer 822 is operable to electronically store the individual's responses to at least a selected plurality of the first set of questions presented to the individual.

An electronic applicant predictor 832 is responsive to the stored answers and is operable to predict at least one post-hire outcome if the individual were to be employed by the employer. The applicant predictor 832 can provide a prediction of the outcome based on correlations of the stored answers with answers to sets of the same questions by other individuals for which post-hire information has been collected. The predictor 832 can include a model constructed according to techniques described herein, such as in "Example 3—Building a Predictive Model" and others.

An electronic results provider 842 can provide an output indicating the outcome to assist in determining the suitability of the individual for employment by an employer.

Some actions or elements might be performed or implemented by different parties and are therefore not necessarily included in a particular method or system. For example, collection of data might be performed by one organization, and another might generate the prediction.

EXAMPLE 2

Collecting Information

As described with reference to FIG. 1 above, pre-hire information can be a variety of information collected from a variety of sources. One possible source for pre-hire information is a paper-based collection source 122, such as a paper-based job application or test. Paper-based sources can be converted into electronic form by manual data entry or scanning.

Another possible source is an electronic device 124. Such an electronic device can, for example, be a computer, a computer-based kiosk, a screen phone, a telephone, or a biometric device. For example, pre-hire content (e.g., a job application or skills test) can be presented to an applicant, who responds (e.g., answers questions) directly on the electronic device 124. Questions can be logically connected so that they are presented only if appropriate (e.g., if the employee answers affirmative to a question about termination, the device can then inquire as to the reason for termination).

Still another possible source for pre-hire information 112 is from a third party service 126. For example, credit reporting agencies, background check services, and other services can provide information either manually or over an online connection.

Yet another possible source for pre-hire information 112 is from another source 128. For example, later-developed technologies can be incorporated.

Any of the pre-hire information can be collected from a remote location (e.g., at a work site or from the applicant's home). The information 112 can then be stored in a central location, such as at an organization's information technology center or at an employment recommendation service's information technology center or a data warehouse.

The pre-hire information 112 can be collected for an applicant when the applicant applies for a job or other times. For example, data may be obtained concerning individuals who have yet to apply for employment, such as from an employee job search web site or firm. The response data can then be used to predict the probable job effectiveness of an applicant and the results of each prediction. Probable job effectiveness can be described, for example in terms of desired criteria and can include behavioral predictions.

The electronic device can be placed online in a variety of ways. For example, an external telecommunications data link can be used to upload applicant responses to a host computer and download changes in pre-hire content, administration instructions, data handling measures, and other administration functions.

A modem connection can be used to connect via a telephone network to a host computer (e.g., central server), or a URL can be used to establish a web connection (e.g., via the Internet, an intranet, an extranet, and the like). Another network type (e.g., satellite) can be used. In this way, real-time data collection can be implemented.

The electronic device 124 can allow an applicant to enter text or numeric data or select from multiple response options, or register a voice or other biophysical response to a machine administered stimulus. The electronic device 124 can be programmable so that the presented content can be modified, and the presented content can be drawn from a remote source. Such content can include text-based questionnaires, multi-media stimuli, and biophysical stimuli.

The electronic device 124 can, for example, include computer-readable media serving as memory for storing pre-hire content and administration logic as well as the applicant's response data. Alternatively, such content, logic, and responses can be stored remotely.

The device 124, as other examples, can include a standard computer interface (e.g., display, keyboard, and a pointing device), hand-held digital telecommunication devices, digitally enabled telephone devices, touch-screen kiosk delivery systems, multi-purpose electronic transaction processors such as Automated Teller Machines, travel reservation machines, electronic gaming machines, and biophysical apparatus such as virtual reality human interface equipment and biomedicial devices.

Further, pre-hire information can include geographic elements, allowing geographical specialization (e.g., by region, county, state, country, or the like).

Post-hire information can similarly be collected in a variety of ways from a variety of sources, including evaluations, termination information, supervisor ratings, payroll information, and direct measures such as sales or units produced, number of accidents, and the like.

For example, after an employee has been on the job for a sufficient time, an evaluation can be made. Alternatively, upon termination of the employee, the employee's supervisor can rate the person's performance in an exit evaluation or the employee can complete an employee exit interview. Such collection can be accomplished by receiving answers to questions on an electronic device, such as the device 124 of FIG. 1.

Other available measures, such as length of service (e.g., tenure), sales, unit production, attendance, misconduct, number of accidents, eligibility for rehire after termination, and whether the employee was involuntarily terminated may also be collected. Generally, post-hire information is collected for post-hire outcomes for which a prediction is desired. Such outcomes can, for example, include performance or job effectiveness measures concurrent with employment.

EXAMPLE 3

Building a Predictive Model

A variety of techniques can be used to build one or more predictive models for predicting post-hire outcomes for a job applicant. The model can take one or more inputs (e.g., pre-hire information) and generates one or more outputs (e.g., predicted post-hire outcomes). For example, a model can be based on artificial intelligence, such as a neural network, a structural equation, an information theoretical model, a fuzzy logic model, or a neuro-fuzzy model.

Figure 9:
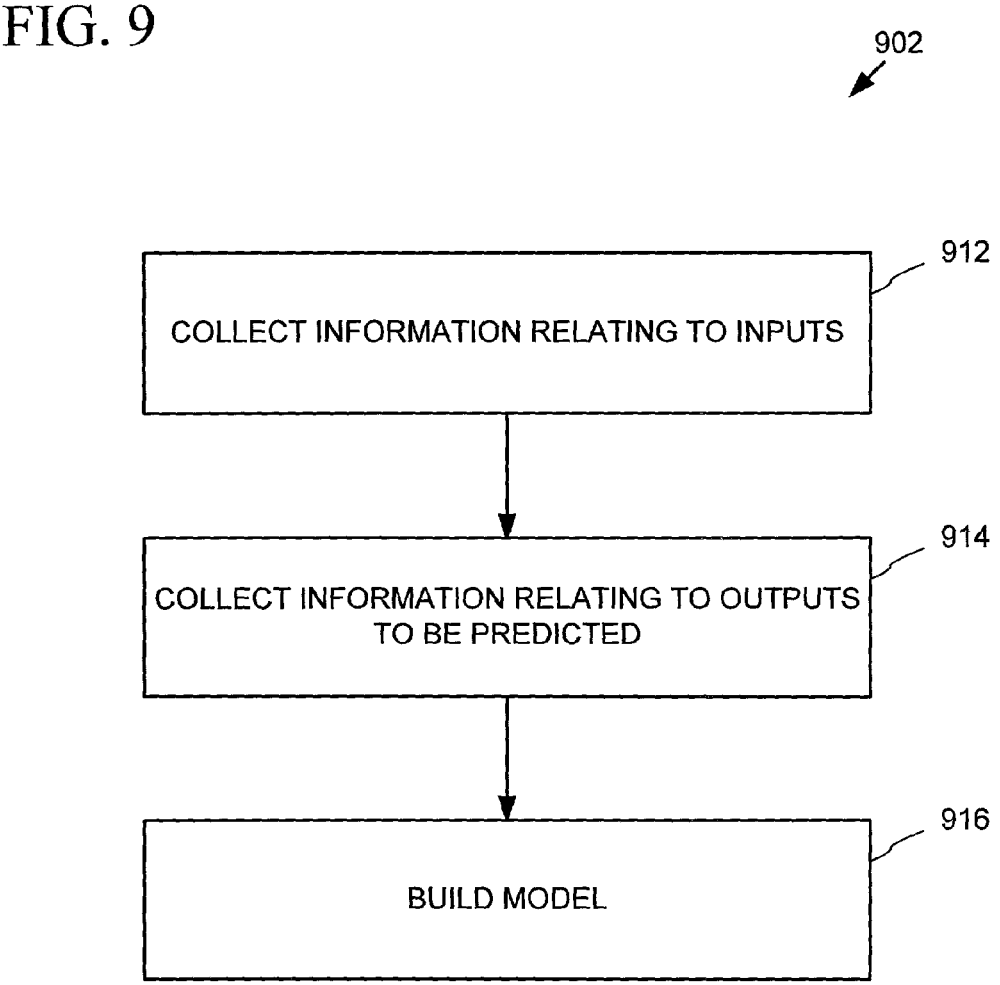
FIG. 9 is a flowchart illustrating an exemplary method for building a predictive model.

FIG. 9 shows an exemplary method 902 for building a predictive model. At 912, information relating to inputs (e.g., pre-hire information) is collected. At 914, information relating to outputs to be predicted (e.g., post-hire information) is collected. Based on the inputs and outputs to be predicted, the model is built at 916.

When building a model, a variety of various proposed models can be evaluated, and one(s) exhibiting superior performance can be chosen. For example, various types of feed-forward neural networks (e.g., back propagation, conjugate gradients, quasi-Newton, Levenberg-Marquardt, quick propagation, delta-bar-delta, linear, radial basis function, generalized regression network [e.g., linear], and the like) can be built based on collected pre- and post-hire data and a superior one identified and chosen. The proposed models can also be of different architectures (e.g., different number of layers or nodes in a layer). It is expected that other types of neural network types will be developed in the future, and they also can be used.

Similar techniques can be used for types of models other than neural networks. In some cases, trial and error will reveal which type of model is suitable for use. The advice of an industrial psychologist can also be helpful to determine any probable interaction effects or other characteristics that can be accounted for when constructing proposed models.

Various commercially-available off-the-shelf software can be used for constructing artificial intelligence-based models of different types and architectures. For example, NEURALWORKS software (e.g., NEURALWORKS Professional II/Plus) marketed by NeuralWare of Carnegie, Pa. and STATISTICA Neural Networks software marketed by StatSoft of Tulsa, Okla. can be used. Any number of other methods for building the model can be used.

A model can have multiple outputs or a single output. Further, multiple models can be built to produce multiple predictions, such as predictions of multiple job performance criteria. Also, a model can be built to be geographically specialized by building it based on information coming from a particular region, county, state, country, or the like.

Occupationally-specialized or education level-specialized models can also be constructed by limiting the data used to build the model to employees of a particular occupation or educational level.

One possible way of building a neural network is to divide the input data into three sets: a training set, a test set, and a hold-out set. The training set is used to train the model, and the test set is used to test the model and possibly further adjust it. Finally, the hold-out set is used as a measure of the model's ability to generalize learned pattern information to new data such as will be encountered with the model begins processing new applicants. For example, a coefficient (e.g., 0.43) can be calculated to indicate whether the model is valid based on its ability to predict values of the hold-out set. Various phenomenon related to neural networks, such as over-training can be addressed by determining at what point during training the neural network indicates best performance (e.g., via a test set).

Identifying a superior model out of proposed models can be achieved by ranking the models (e.g., by measuring a validity coefficient for a hold-out set of data). During the ranking process, particular types (e.g., neural network or fuzzy logic) or architectures (e.g., number of hidden nodes) may emerge as fruitful for further exploration via construction of other, similar proposed models.

EXAMPLE 4

Identifying Ineffective Predictors

Ineffective (e.g., non-predictive or low-predictive) predictors can be identified. For example, using an information-theory-based technique called "information transfer," pre-hire content can be identified as ineffective. Generally, an ineffective predictor is a predictor that does not serve to effectively predict a desired job performance criterion. For example, answers to a particular question may exhibit a random relationship to a criterion and simply serve as noise in data.

One technique for identifying ineffective predictors is to consider various sets of permutations of predictive items (e.g., answers to job application questions A, B, C, A & B, A & C, B & C, and A & B & C) and evaluate whether the permutation set is effective. If an item is not in any set of effective predictors, the item is identified as ineffective. It is possible that while an item alone is ineffective, it is effective in combination with one or more other items. Additional features of information transfer-based techniques are described in greater detail below.

After predictors are identified as ineffective, various actions can be taken, such as omitting them when constructing a model or removing corresponding questions from a job application. Or, an indication can be provided that information relating to such predictors no longer need be collected.

EXAMPLE 5

Building a Model Based on Having Identified Ineffective Predictors

Predictors identified as ineffective can be ignored when building a model. In other words, one part of the model-building process can be choosing inputs for the model based on whether the inputs are effective.

Reducing the number of inputs can reduce the complexity of the model and increase the accuracy of the model. Thus, a more efficient and effective model-building process can be achieved.

EXAMPLE 6

Exemplary Model

Figure 10:
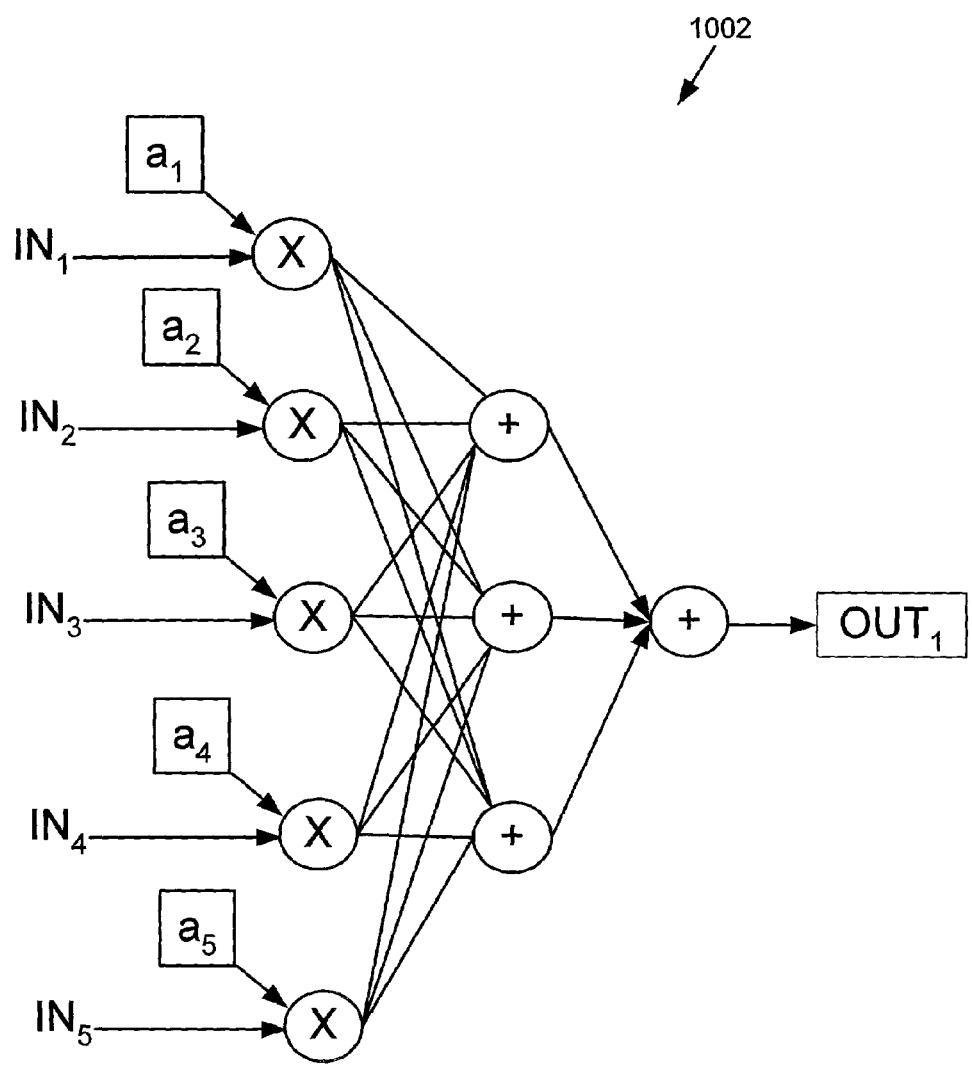
FIG. 10 is a block diagram showing an exemplary predictive model.

FIG. 10 shows a simple exemplary predictive model 1002 with predictive inputs $IN_1$, $IN_2$, $IN_3$, $IN_4$, and $IN_5$. Various weights $a_1$, $a_2$, $a_3$, $a_4$, and $a_5$ can be calculated during model training (e.g., via back-propagation). The inputs are used in combination with the weights to generate a predicted value, $OUT_1$. For example, the inputs might be answers to questions on a job application, and the predicted value might be expected job tenure.

A predictive model can estimate specific on-the-job behaviors that have been described for validation analysis in mathematical terms. Although a two-layer model is shown, other numbers of layers can be used. In addition, various other arrangements involving weights and combinations of the elements can be used. In fact, any number of other arrangements are possible.

EXAMPLE 7

Refining a Model

Predictors identified as ineffective can be removed from pre-hire content. For example, if a question on a job application is found to be an ineffective predictor for desired job performance criteria, the question can be removed from the job application. Additional questions can be added (these, too, can be evaluated and possibly removed later).

New pre-hire information can be collected based on the refined pre-hire content. Then corresponding new post-hire information can be collected. Based on the new information, a refined model can be built. Such an arrangement is sometimes called "performance-driven systematic rotation of pre-hire content."

In this way, questions having little or no value can be removed from an employment application, resulting in a shorter but more effective application. Predictive content can be identified by placing a question into the pool of questions and monitoring whether it is identified as ineffective when a subsequent model is constructed.

Model refinement can also be achieved through increased sample size, improvements to model architecture, changes in the model paradigm, and other techniques.

A system using the described refinement process can be said to exhibit adaptive learning. One advantage to such an arrangement is that the system can adapt to changing conditions such as changing applicant demographics, a changing economy, a changing job market, changes in job content, or changes to measures of job effectiveness.

EXAMPLE 8

Exemplary Refined Model

Figure 11:
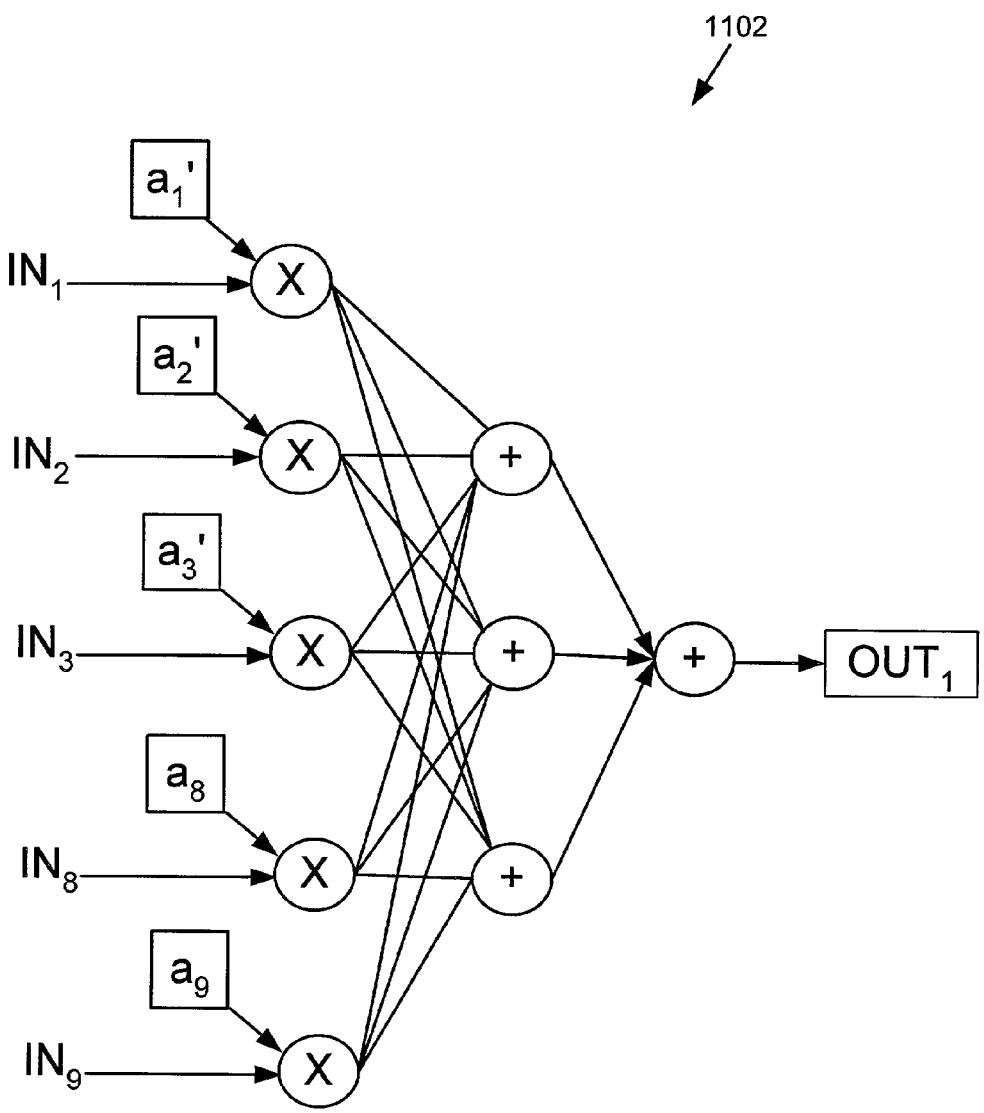
FIG. 11 is a block diagram showing an exemplary refined predictive model.

FIG. 11 shows a simple exemplary refined predictive model 1102. In the example, it was determined that $IN_4$ and $IN_5$ were ineffective predictors, so the content (e.g., question) related to $IN_4$ and $IN_5$ was removed from the corresponding employment application. Based on the finding that $IN_4$ and $IN_5$ were not effective predictors, they were not included in the model deployed at that time. A set of new questions was added to the employment application.

When selecting new questions, it may be advantageous to employ the services of an industrial psychologist who can evaluate the job and determine appropriate job skills. The psychologist can then determine an appropriate question to be asked to identify a person who will fit the job.

Subsequently, after pre-hire and post-hire information for a number of employees was collected, the new model 1102 was generated from the collected information. Two of the new questions were found to be effective predictors, so they were included in the refined model as $IN_8$ and $IN_9$. $IN_4$ and $IN_5$ do not appear because they had been earlier found to be ineffective predictors.

EXAMPLE 9

Prediction Types

A predictive model can generate a variety of prediction types. For example, a single value (e.g., "36 months" as a likely term of employment) can be generated. Or, a range of values (e.g., "36–42 months" as a likely range of employment term) can be generated. Or, a rank (e.g., "7 out of 52" as how this applicant ranks in tenure as compared to 52 other applicants) can be generated.

Further, probabilities can be generated instead of or in addition to the above types. For example, a probability that an individual will be in a certain range can be generated (e.g., "70% —36 or more months"). Or, a probability of a certain value can be generated ("5% —0 accidents"). Or, probability of membership in a group can be generated (e.g., "75% involuntarily terminated").

Various combinations and permutations of the above are also possible. Values can be whatever is appropriate for the particular arrangement.

EXAMPLE 10

Predicted Outcomes

Predicted post-hire outcomes can be any of a number of metrics. For example, number of accidents, sales level, eligibility for rehire, voluntary termination, and tenure can be predicted. There can be various models (e.g., one for each of the measurements) or one model can predict more than one. The predicted outcomes can be job performance criteria used when making a hiring recommendation.

EXAMPLE 11

Hiring Recommendation

After determining the suitability of the individual for employment by the employer, based on one or more predictions generated by one or more models, a hiring recommendation can be made. The recommendation can be provided by software.

The recommendation can include an estimate of future behavior and results can be reported in behavioral terms. Alternatively, an employer might indicate the relative importance of predicted outcome values, such as a specific set of job performance criteria. Such information can be combined with generated predicted outcomes to generate an overall score. Applicants having a score over a particular threshold, for example, can be identified as favorable candidates. Further evaluation (e.g., a skills test or interview) may or may not be appropriate.

EXAMPLE 12

Payroll-Based Information Collection

A problem can arise when collecting post-hire information. For example, it may be difficult to achieve high compliance rates for exit interviews. Also, collection of information relating to termination dates and reasons for termination may be sporadic.

Post-hire information can be generated by examining payroll information. For example, a system can track whether an employee has been dropped from the payroll. Such an event typically indicates that the employee has been terminated. Thus, the employee's tenure can be determined by comparing the termination date with the employee's hire date. Further, available payroll information might indicate whether an employee was voluntarily or involuntarily terminated and whether or not the employee is eligible for rehire and why the termination occurred. Still further, the payroll information can indicate a job change (e.g., a promotion).

Figure 12:
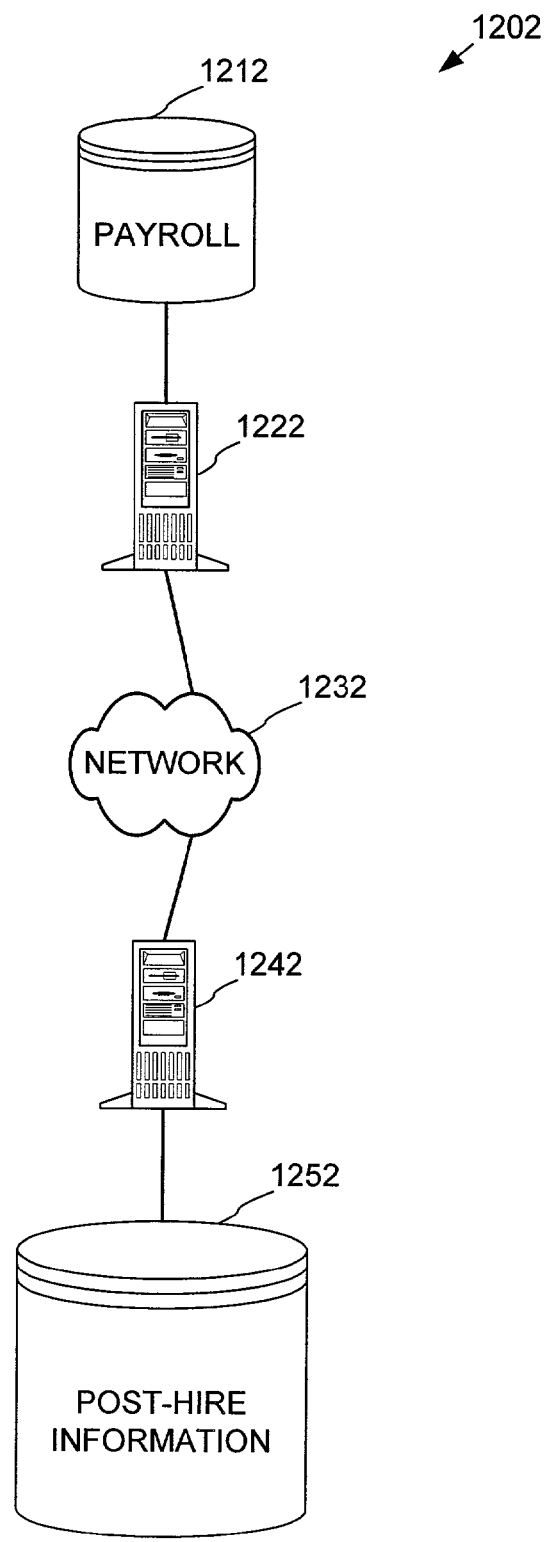
FIG. 12 is a block diagram illustrating integration of payroll information into a predictive system.

Thus, much post-hire information can be commonly collected based on payroll information, and a higher sample size can be achieved. An exemplary arrangement 1202 for collecting such information is shown in FIG. 12. In the example, the payroll information 1212 is accessible by a payroll server 1222. Communication with the payroll server 1222 can be achieved over a network 1242 (e.g., via the Internet or another network). The server 1242 receives information from the payroll server 1222 via the network 1232 (e.g., via any number of protocols, such as FTP, email, and the like). The information is then stored in the post-hire information database 1252. For example, payroll information can be scheduled for automatic periodic sending or may be sent upon initiation by an operator.

Although an online arrangement is shown, the information can also be provided manually (e.g., via removable computer-readable media). In some cases, the information may need to be reformatted so it matches the format of other data in the database 1252.

EXAMPLE 13

Exemplary Implementations

In various implementations of the technologies, a computer-implemented system can be provided that collects pre-hire applicant information used to assess suitability for employment in specific jobs. The computer system can also collect post-hire measures of the job effectiveness of employees hired using the system.

The pre-hire and post-hire information can then be converted and stored electronically as numeric data where such data can be logically quantified. Artificial intelligence technology and statistical analysis can be used to identify patterns within the pre-hire data that are associated with patterns of job effectiveness stored in the post-hire data. Pre-hire data patterns with significant associations with different post-hire patterns are then converted to mathematical models (e.g., data handling routines and equations) representing the observed relationships.

Following the development of interpretive algorithms that operationalize the pattern relationships observed in a sample of complete employment cycles, the pre-hire data collection system can then be re-programmed to run such interpretive formulas on an incoming data stream of new employment applications. Formula results can be interpreted as an estimate of the probable job effectiveness of new applicants for employment based on response pattern similarity to others (e.g., employees). Interpretive equation results can be reported in behavioral terms to hiring managers who can use the information to identify and hire those applicants whose estimated job performance falls within an acceptable range.

The system can be capable of adaptive learning, or the ability to modify predictive models in response to changing data patterns. Adaptive learning can be operationalized using artificial intelligence technologies, short cycle validation procedures and performance-driven item rotation. The validation cycle can be repeated periodically as new employment histories are added to the database. With successive validation cycles, pre-hire predictor variables that have little or no relationship to job effectiveness can be dropped. New item content can replace the dropped items. Predictive variables can be retained and used by interpretive algorithms until sufficient data has accumulated to integrate the new predictors into the next generation interpretive algorithm. The outdated algorithm and associated records can be archived and the new model deployed. Adaptive learning can enable evolutionary performance improvement, geographic specialization, and shorter, more accurate pre-hire questionnaires.

EXAMPLE 14

Criterion Validation

Criterion validation includes discovering and using measures of individual differences to identify who, out of a group of candidates, is more likely to succeed in a given occupation or job. Individual differences are measures of human characteristics that differ across individuals using systematic measurement procedures. Such measures include biographic or life history differences, standardized tests of mental ability, personality traits, work attitudes, occupational interests, work-related values and beliefs, and tests of physical capabilities, as well as traditional employment-related information, such as employment applications, background investigation results, reference checks, education, experience, certification requirements, and the like.

Criterion validation includes the research process used to discover how these measures of individual differences relate to a criterion or standard for evaluating the effectiveness of an individual or group performing a job. Typical measures of job effectiveness include performance ratings by managers or customers, productivity measures such as units produced or dollar sales per hour, length of service, promotions and salary increases, probationary survival, completion of training programs, accident rates, number of disciplinary incidents or absences, and other quantitative measures of job effectiveness. Any of these measures of job effectiveness and others (e.g., whether an applicant will be involuntarily terminated, and the like) can be predicted via a model.

Pre-hire metrics, including those listed above, called predictors, can be analyzed in relation to each criterion to discover systematic co-variation. A common statistic used to summarize such relationships is the Pearson Product Moment Correlation coefficient, or simply the validity coefficient. If a predictor measure is found to correlate with a criterion measure across many individuals in a validation sample, the predictor is said to be "valid," that is predictive of the criterion measure. Valid predictors (e.g., pre-hire information) that correlate with specific criteria, such as post-hire measures (e.g., including concurrent performance measures) are then used in the evaluation of new candidates as they apply for the same or similar jobs. Individual differences in temperament, ability, and other measures can have profound and measurable effects on organizational outcomes.

In employee selection, an independent (e.g., "predictor") variable can be any quantifiable human characteristic with a measurable relationship to job performance. Physical measurements, intelligence tests, personality inventories, work history data, educational attainment, and other job-related measures are typical. The dependent (e.g., "criterion") variable can be defined as a dependent or predicted measure for judging the effectiveness of persons, organizations, treatments, or predictors of behavior, results, and organizational effectiveness.

In general, measures of job performance include objective numeric data, such as absenteeism, accident rates, unit or sales productivity can be readily verified from direct observation and are sometimes called "hard" measures. Objective measures of job performance may be available for only a small set of narrowly-defined production and other behaviorally-specific jobs. In the absence of hard measurement, opinion data such as performance ratings by managers can be used for the same purpose.

Establishing the criterion validity of a selection test or group of tests can include informed theory building and hypothesis testing that seeks to confirm or reject the presence of a functional relationship.

EXAMPLE 15

Artificial Intelligence Techniques

Artificial intelligence can attempt to simulate human intelligence with computer circuits and software. There are at least three approaches to machine intelligence: expert systems, neural networks, and fuzzy logic systems. Expert systems can capture knowledge of human experts using rule-based programs to gather information and make sequential decisions based on facts and logical branching. These systems involve human experts for constructing the decision models necessary to simulate human information processing. Expert systems can be used to standardize complex procedures and solve problems with clearly defined decision rules.

Neural networks (also commonly called "neural systems," "associative memories," "connectionist models," "parallel distributed processors," and the like) can be computer simulations of neuro-physiological structures (e.g., nerve cells) found in nature. Unlike expert systems, artificial neural networks can learn by association or experience, rather than being programmed. Like their biological counterparts, neural neworks form internal representations of the external world as a result of exposure to stimuli. Once trained, they can generalize or make inferences and predictions about data that they have not been exposed to before. Neural networks are able to create internal models of complex, nonlinear multivariate relationships, even when the source data is noisy or incomplete. It is this capacity to function with uncertain or fuzzy data that makes a neural processor valuable in the real world.

Fuzzy computation includes a set of procedures for representing set membership, attributes, and relationships that cannot be described using single point numeric estimates. Fuzzy systems can allow computers to represent words and concepts such as vagueness, uncertainty, and degrees of an attribute. Fuzzy systems can allow computers to represent complex relationships and interactions between such concepts. They can also be a useful tool for describing human attributes in terms that a computer can process. Fuzzy concepts and fuzzy relationship models can be used in an employee selection system to represent predictor-criterion interactions when such relationships are supported by analysis of the available data.

Neuro-fuzzy technology is a hybrid artificial intelligence technique employing the capabilities of both neural network learning and fuzzy logic model specification. In an employee selection system, predictor-criterion relationships can be described initially as a fuzzy model and then optimized using neural network training procedures. In the absence of evident explanatory predictor-criterion relationships, unspecified neural networks can be used until such relationships can be verified.

Genetic algorithms can represent intelligent systems by simulating evolutionary adaptation using mathematical procedures for reproduction, genetic crossover, and mutation. In an employee selection system, genetic algorithm-based data handling routines can be used to compare the prediction potential of various combinations of predictor variables to optimize variable selection for model development.

Information theoretic based feature selection can be based on information theory. Such a technique can use measures of information transmission to identify relations between independent and dependent variables. Since information theory does not depend on a particular model, relation identification is not limited by the nature of the relation. Once the identification process is complete, the set of independent variables can be reduced so as to include only those variables with the strongest relationship to the dependent variables.

Such a pre-filtering process facilitates the modeling process by removing inputs which are (e.g., for the most part) superfluous and would therefore constitute input noise to the model. A reduction in the dimensionality of the input vector to the model also reduces the complexity of the model and in some cases (e.g., neural networks), greatly reduces the computational expense involved in model generation.

Information theoretic-based modeling techniques such as reconstructability analysis can be used in an employee selection system. Such techniques use informational dependencies between variables to identify the essential relations within a system. The system is then modeled by reproducing the joint probability distributions for the relevant variables. The benefits of such modeling techniques include that they do not depend on a model and can emulate both deterministic and stochastic systems.

An employee selection system can include adaptive learning technology. Such a system can be constructed as a hybrid artificial intelligence application, based in part on various (or all) of the above artificial intelligence technologies. Expert systems can be employed to collect and process incoming and outgoing data, transfer data between subsystems internally and in model deployment. Neural networks can be used for variable selection, model development, and adaptive learning. Fuzzy set theory, fuzzy variable definition, and neuro-fuzzy procedures can be used in variable specification, model definition, and refinement. Genetic algorithm techniques can be used in variable selection, neural network architecture configuration and model development and testing. Information theoretic feature selection and modeling techniques can be used in data reduction, variable selection, and model development.

EXAMPLE 16

Electronic Repository System

Externally-collected data can be sent to an in-bound communications sub-system that serves as a central repository of information. Data can be uploaded via a variety of techniques (e.g., telephone lines, Internet, or other data transfer mechanisms). The in-bound communications sub-system can include a set of software programs to perform various functions.

For example, the sub-system can receive incoming data from external data collection devices. The incoming data can be logged with a date, time and source record. Data streams can be stored to a backup storage file.

After data reception, the subsystem can respond to the source device with a text message indicating that transmission was successful or unsuccessful; other messages or instructions can be provided. The data stream can be transferred to a transaction monitor (e.g., such as that described below) for further processing.

The subsystem can also download machine-specific executable code and scripting files to external data collection devices when changes to the user-interface are desired. The download transmissions can be logged by date, time, and status and the external device's response recorded.

EXAMPLE 17

Transaction Monitor

A transaction monitor can serve as an application processing system that directs information flow and task execution between and among subsystems. The transaction monitor can classify incoming and outgoing data streams and launch task-specific sub-routines using multi-threaded execution and pass sub-routine output for further processing until transactions (e.g., related to data streams) have been successfully processed.

A transaction monitor can perform various functions. For example, the transaction monitor can classify data streams or sessions as transactions after transmission to an in-bound communications sub-system. Classification can indicate the processing tasks associated with processing the transaction.

Data can be parsed (e.g., formatted into a pre-defined structure) for additional processing and mapped to a normalized relational database (e.g., the applicant database described below). Data elements can be stored with unique identifiers into a table containing similar data from other sessions.

Session processing task files can be launched to process parsed data streams. For example, an executable program (e.g., C++ program, dynamic link library, executable script, or the like) can perform various data transmission, transformation, concatenation, manipulation or encoding tasks to process the sessions.

Output from session processing tasks can then be formatted for further processing and transmission to external reporting devices (e.g., at an employer's site). For example, the imaging and delivery sub-system described below can be used.

EXAMPLE 18

Applicant Database

A relational database can store pre- and post-employment data for session transactions that are in process or were received and recently processed. As individual session records age, they can be systematically transferred to another storage database (e.g., the reports database described below).

Both databases can consist of electronically-stored tables made up of rows and columns of numeric and text data. In general, rows contain identifier keys (e.g., unique keys) that link elements of a unique session to other data elements of that session. Columns can hold the component data elements. Unique session data can be stored across many tables, any of which may be accessed using that session's unique identification key.

An arrangement of three basic types of data can be used for the applicant database. First, standard pre-hire application information (e.g., name, address, phone number, job applied for, previous experience, references, educational background, and the like) can be stored. Also, included can be applicant responses to psychological or other job-related assessments administered via an external data collection device (e.g., the electronic device 124 of FIG. 1).

Second, post-hire data about the job performance of employees after being hired can be stored. Such data can include, for example, supervisor opinion ratings about the employee's overall job performance or specific aspects of the employee's job effectiveness. Quantitative indicators about attendance, sales or unit production, disciplinary records and other performance measures may also be collected.

Third, employer-specific information used to process transactions can be stored. Such data can include information for sending an appropriate electronic report to a correct employer location, information related to downloading user interface modifications to specific data collection devices, and information for general management of information exchange between various sub-systems. For example, employer fax numbers, URL's, email accounts, geographic locations, organizational units, data collection unit identifier, and the like can be stored.

Other information or less information can be stored in the database. Further, the database may be broken into multiple databases if desired.

EXAMPLE 19

Reports Database

A reports database can be a relational database serving as a central repository for records processed by the applicant database. Applicant records for applicants not hired can be deleted. Applicant records for applicants aged over a certain client-specified record retention time limit can be deleted.

The reports database can be used as a source for the data used in generating, printing, or posting corporate reports (e.g., such as those described below). Such data can include client-specific records of employment applications received for recent reporting periods, plus pre-hire predictor and post-hire criterion performance data.

EXAMPLE 20

Corporate Reports

Useful information can be collected in the course of operating a hiring recommendation system. For example, information about applicant flow, hiring activity, employee turnover, recruiting costs, number of voluntary terminations, applicant and employee characteristics and other employee selection metrics can be collected, stored, and reported.

Standardized reports can be provided to employers via printed reports, fax machines, email, and secure Internet web site access. Source data can come from the reports database described above. Custom reports can also be generated.

EXAMPLE 21

Sample Size Monitor

A sample size monitor can be provided as a computer program that monitors the quality and quantity of incoming data and provides an indication when a sufficient number or predictor-criterion paired cases have accumulated. For example, employer-specific validation data can be transferred to a model development environment upon accumulation of sufficient data.

The program can use an expert system decision rule base to keep track of how many complete employee life cycle histories are in a reports database. In addition, the software can examine and partition individual records that may be unusable due to missing fields, corrupted data, or other data fidelity problems. Using pre-defined sample size boundaries, the software can merge available pre- and post-hire data transfer and transfer a file to the validation queue (e.g., the queue described below).

EXAMPLE 22

External Service Providers

A system can interface with other online data services of interest to employers. Using a telecommunication link to third party service computers, a transaction monitor can relay applicant information to trigger delivery of specialized additional pre-hire data which can then be added to an applicant database and used in subsequent analysis and reporting. Such services can include, for example, online work opportunity tax credit (WOTC) eligibility reporting, online social security number verification, online background investigation results as indicated by specific jobs, and psychological assessment results, including off-line assessment. Such services are represented in FIG. 1 as the third party service 126.

EXAMPLE 23

Validation Queuing Utility

Validation queuing utility software can be provided to serve as a temporary storage location for criterion validation datasets that have not yet been processed in a model development environment (e.g., such as that described below). Datasets can be cataloged, prioritized, and scheduled for further processing using predefined decision rules. When higher priority or previously-queued datasets have been processed, the file can be exported to the analysis software used for model development.

EXAMPLE 24

Model Development Technique

Model development can result in the creation of a model that represents observed functional relationships between pre-hire data and post-hire data. Artificial intelligence technologies can be used to define and model such relationships. Such technologies can include expert systems, neural networks and similar pattern function simulators, fuzzy logic models, and neuro-fuzzy predictive models.

Various procedures can be implemented. For example, the distribution of pre-hire variables (sometimes called "independent" or "predictor variables") can be analyzed in relation to the distribution of post-hire outcome data (sometimes called "dependent" or "criterion variables").

Using statistical and information theory derived techniques, a subset of predictor variables can be identified that show information transfer (e.g., potential predictive validity) to one or more criterion variables.

An examination of joint distributions may result in the formalization of a fuzzy theoretical model and certain predictors may be transformed to a fuzzy variable format.

If an obvious theoretical model does not emerge from this process, the remaining subset of promising variables can be categorized and transformed for neural network training. Non-useful (e.g., ineffective) predictor variables can be dropped from further analysis.

The total sample of paired predictor-criterion cases (e.g., individual employee case histories) can be segmented into three non-overlapping sub-samples with group membership being randomly defined. Alternate procedures, such as randomized membership rotation may also be used to segment the data.

A training set can be used to train a neural network or neuro-fuzzy model to predict, classify, or rank the probable criterion value associated with each instance of predictor input variables. A test set can be used to evaluate and tune the performance (e.g., predictive accuracy) of models developed using the training set. A hold-out or independent set can be used to rank trained networks by their ability to generalize learning to unfamiliar data. Networks with poor predictive accuracy or low generalization are dropped from further development.

Surviving trained models can then be subjected to additional testing to evaluate acceptability for operational use in employee selection. Such testing can include adverse impact analysis and selection rate acceptability.

Adverse impact analysis can evaluate model output for differential selection rates or bias against protected groups. Using independent sample output, selection rates can be compared across gender, ethnicity, age, and other class differences for bias for or against the groups. Models which demonstrate differential prediction or improper bias can be dropped from further development.

Selection rate acceptability can include evaluation of selection rates for hire/reject classification models. Selection rates on the independent sample can be evaluated for stringency (e.g., rejects too many applicants) or leniency (e.g., accepts too many applicants) and models showing these types of errors can be dropped.

Final candidate networks can be ranked according to their performance on test parameters, and the single best model can be converted to a software program for deployment in a live employee selection system. The coded program can then be passed to the deployment and archiving modules (e.g., such as those described below).

Such an iterative process can be repeated as different predictor-criterion relationships emerge. As sufficient data accumulates on specific criterion outcomes, additional predictive models can be developed. Older models can eventually be replaced by superior performing models as item content is rotated to capture additional predictive variation (e.g., via the item rotation module described below). Sample size can continue to increase. Thus, a system can evolve toward higher predictive accuracy.

EXAMPLE 25

Model Deployment Technique

Deployment of a model can include a hiring report modification and model insertion. The hiring report modification can include modifications to an imaging and delivery subsystem and an applicant processing system (e.g., the above-described transaction monitor).

To facilitate employer use of model predictions, numeric output can be translated into text, number, or graphics that are descriptive of the behavior being predicted. Output can be presented to an employer in behavioral terms.

When a criterion to be predicted is a number, the exact numeric estimate can be couched in a statement or picture clearly describing the predicted behavior. For example, if the model has produced an estimate of an applicant's probable length of service in days, the hiring report can be modified to include a statement such as the following example:

Based on similarity to former employees, this applicant's estimated length of service is X days, plus or minus Y days margin of error.

X can be the specific number of days that the trained predictive model has provided as an estimate of the applicant's probable length of services, and Y can be the statistical margin of error in which the majority of cases will tend to fall.

When the criterion to be predicted is group membership (e.g., whether or not the applicant is likely to belong to a specific group), the model estimate may be expressed as a probability, or likelihood, that the applicant will eventually be classified in that group. For example, if the predictive model has been trained to classify employee response patterns according to the probability that they would be eligible for rehire instead of not being eligible for rehire upon termination, a statement or graphic similar to the following example can be presented on a hiring report:

Based on similarity to former and/or current employees, this applicant's probability of being eligible for rehire upon termination is X percent.

X can be a probability function expressed as a percentage representing the number of chances in one hundred that the particular applicant will be eligible for rehire when he or she leaves the company.

When the criterion produced is a ranking or relative position in a ranked criterion, text or graphic images can be used to convey the applicant's position in the criterion field. For example, if the model has produced an estimate of the probable rank of a sales employee's annual sales volume compared to past sales employees, a statement similar to the following example might be used:

Based on similarity to former sales employees, this applicant is likely to produce annual sales in the top Xth (e.g, third, quarter, fifth, or the like) of all sales employees.

X can refer to the ranking method used to classify the criterion measure.

Such text-based reporting methods as described above can be summarized, illustrated with, appended to, or replaced by graphic images representing the behavioral information. For example, charts, graphs, images, animated images, and other content format can be used.

Applicant processing system model insertion can be accomplished by embedding a coded model in the application processing conducted by a transaction monitor after the format of the predictive output has been determined. Data handling routines can separate model input variables from the incoming data stream. The inputs can be passed to the predictive model and be processed. The output of the model can then be inserted or transformed into a reporting format as described above and added to a hiring report transmission.

EXAMPLE 26

Validation Archives

As a new model is deployed, the replaced model can be transferred to an archive storage. The archive can also record applicants processed by the old model. Such an archive can be useful if reconstruction of results for a decommissioned model is desired for administrative or other reasons.

EXAMPLE 27

Exemplary Item Rotation Technique

An item rotation module can be implemented as a software program and database of predictor item content. The item rotation module can be used to systematically change pre-hire content so that useful predictor variables are retained while non-useful (e.g., ineffective) predictors can be replaced with potentially useful new predictors.

Adaptive learning includes the ability of a system to improve accuracy of its behavioral predictions with successive validation cycles. Iterative neural network and neuro-fuzzy model development and performance-driven item rotation can be used to facilitate adaptive learning.

As part of a validation analysis for a model, predictor variables (e.g., pre-hire questions or items) predictive of a criterion measure can be identified. At the same time, other predictors with little or no modeling utility (e.g., ineffective predictors) can be identified.

Performance-driven item rotation includes the practice of systematically retaining and deleting pre-hire content so that item content with predictive utility continues to serve as input for behavioral prediction with the current predictive model and items with little or no predictive utility are dropped from the content. New, experimental item content can be inserted into the content and response patterns can be recorded for analysis in the next validation cycle. Such rotation is shown in Tables 1 and 2.

TABLE 1

Item Content During Validation Cycle #1

| Item | Status |
| --- | --- |
| You help people a lot | Ineffective |
| You tease people until they get mad | Ineffective |
| You have confidence in yourself | Effective |
| You would rather not get involved in other's problems | Ineffective |
| Common sense is one of your greatest strengths | Ineffective |
| You prefer to do things alone | Effective |
| You have no fear of meeting people | Effective |
| You are always cheerful | Ineffective |
| 24 × 7 = ? | Ineffective |
| You get mad at yourself when you make mistakes | Ineffective |
| How many months were you at your last job? | Effective |

TABLE 2

Item Content After Validation Cycle #1

| Item | Status |
| --- | --- |
| Many people cannot be trusted | New experimental item |
| You are not afraid to tell someone off | New experimental item |
| You have confidence in yourself | Effective-retained |
| You try to sense what others are thinking and feeling | New experimental item |
| You attract attention to yourself | New experimental item |
| You prefer to do things alone | Effective-retained |
| You have no fear of meeting people | Effective-retained |
| You can wait patiently for a long time | New experimental item |
| You say whatever is on your mind | New experimental item |
| Background check item | New experimental item |
| How many months were you at your last job? | Effective-retained |

The content shown in Table 1 has been refined to be that shown in Table 2, based on the effectiveness of the predictor items. New experimental items have been added, the effectiveness of which can be evaluated during subsequent cycles.

As successive validation cycles are completed and non-predictive item content is systematically replaced with predictive item content, overall validity improves. After multiple validation cycles, the result can be a shorter pre-hire questionnaire comprised of currently-performing predictive input and a few experimental items being validated in an on-going process for system evolution toward higher predictive accuracy.

EXAMPLE 28

Imaging and Delivery Subsystems

Imaging and delivery subsystems can assemble input from applicant processing to create an electronic image that resembles a traditional employment application that can be transmitted to an employer's hiring site via external data devices (e.g., fax machine, computer with email or web access, hand-held devices, digitally enabled telephones, printers, or other text/graphics imaging devices). Hiring reports can also be delivered as hard copy via mail or other delivery services.

EXAMPLE 29

Hire Site Report Reception

Hiring managers can receive an electronic report that can be printed or simply saved in electronic format. The entire application process can occur in real-time or batch mode (e.g., overnight bulk processing). Real-time processing can result in hiring report reception minutes after pre-hire data is uploaded. Such rapid report reception can be an advantage of the system.

EXAMPLE 30

Exemplary Combination of Elements

Figure 13:
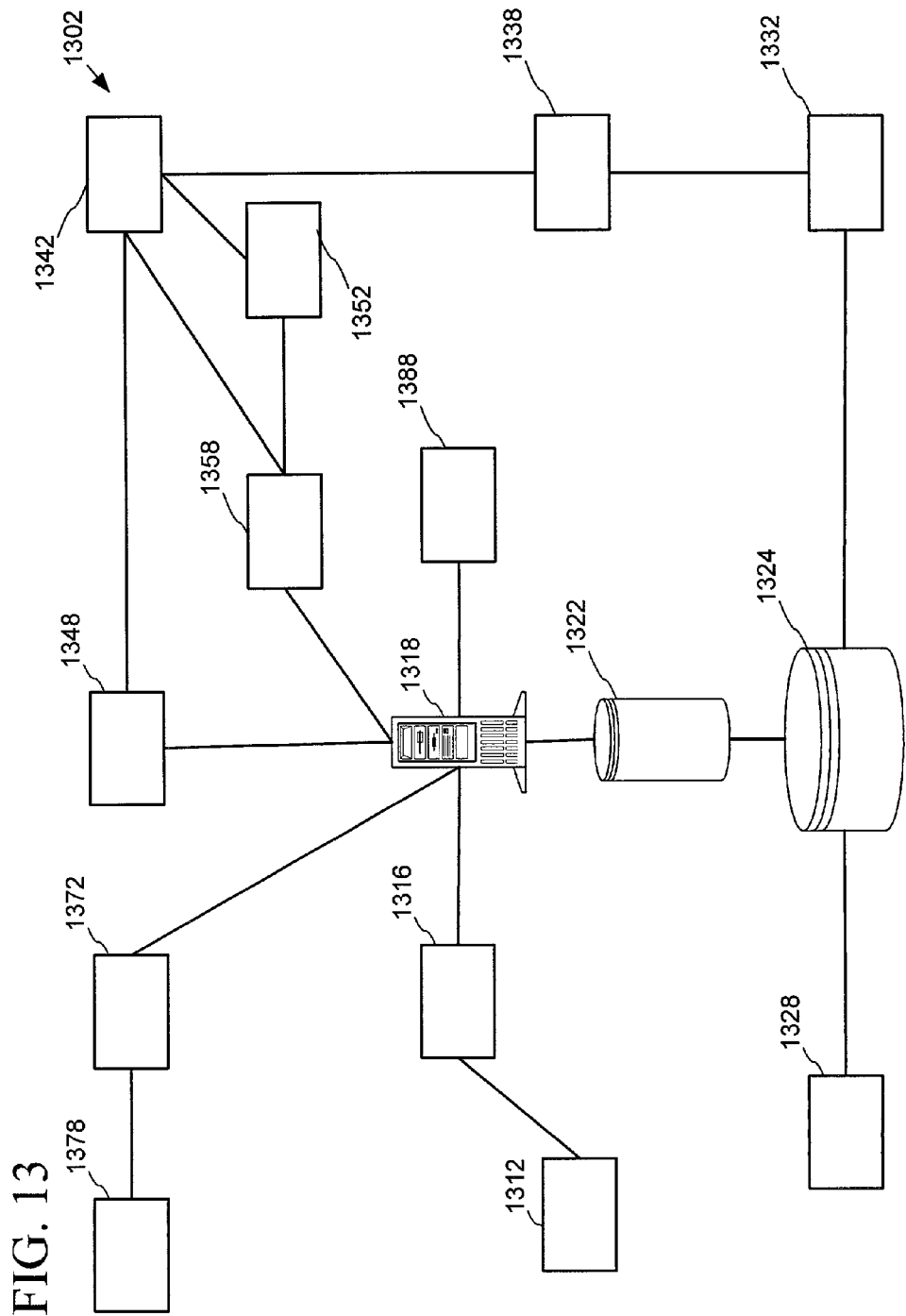
FIG. 13 is a block diagram illustrating an exemplary combination of elements into a system.

The various above-described elements can be combined in various combinations and sub-combinations to construct a system. For example, FIG. 13 shows an exemplary combination of elements.

Pre-hire and post-hire data collection elements 1312 can send, via the incoming communications subsystem 1316, information to the transaction monitor 1318. The information can be stored in the applicant database 1322 while processed and then stored in the reports database 1324. The reports database 1324 can be used to produce corporate reports 1328.

A sample size monitor 1332 can monitor the reports database 1324 and send information, via the validation queue 1338, to the predictive model development environment 1342. Models from the development environment 1342 can be sent for model deployment 1348, including hiring report modification and model insertion.

Archived models can be sent to the validation archives 1352, and an item rotation module 1358 can track rotation of predictive content. Imaging and delivery subsystems 1372 can deliver hire site reports 1378.

External service providers 1388 can interface with the system 1302 to provide a variety of data such as applicant pre-hire information (e.g., background verification, credit check information, social security number verification, traffic and criminal information, and the like).

Fewer or additional elements can be included in a system.

EXAMPLE 31

Exemplary Process Overview

The various techniques described above can be used in a process over time. In such a process, adaptive learning can improve employee selection with successive validation cycles as sample size increases and predictor input systematically evolves to capture more criterion relationships and higher predictor-criterion fidelity. An example is shown in FIGS. 14A–14D.

Figure 14A:
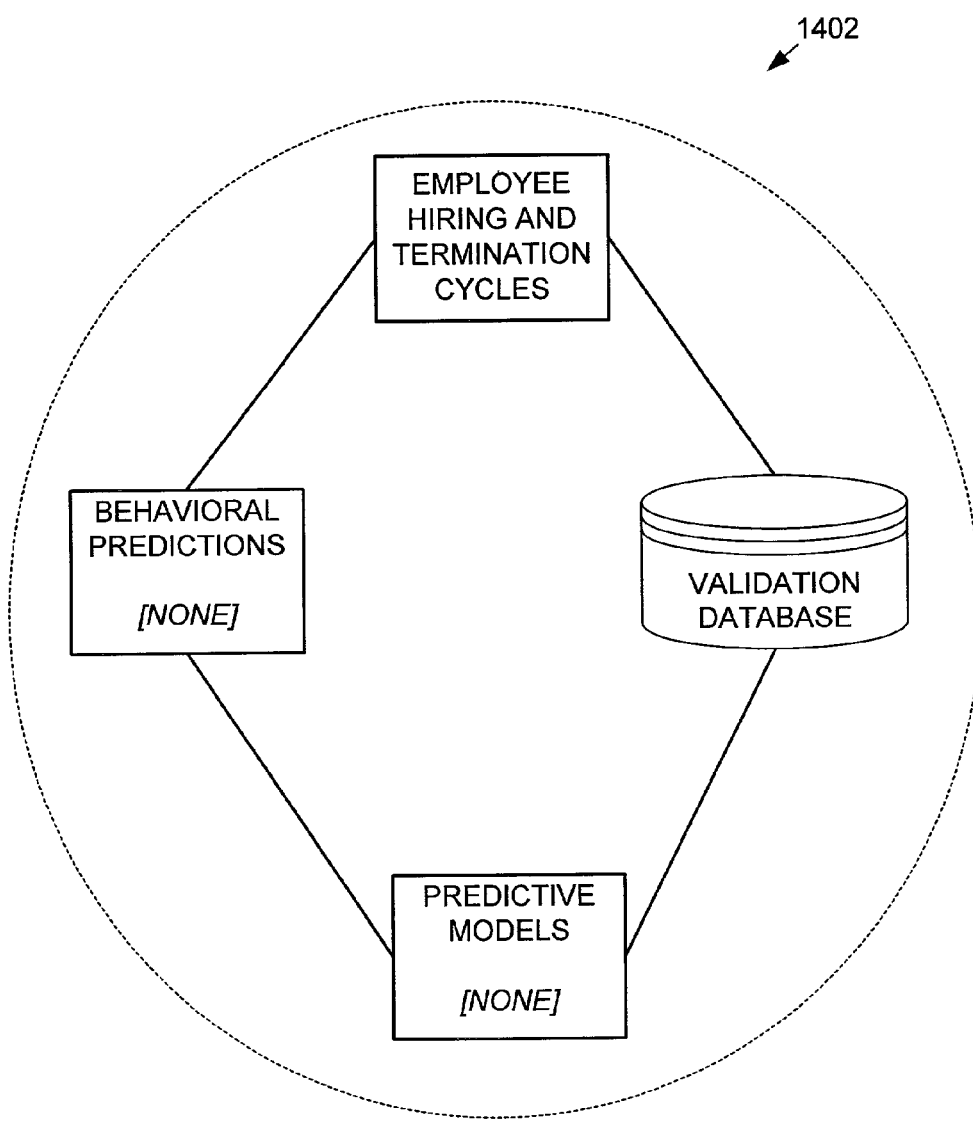
FIGS. 14A–14D are block diagrams illustrating an exemplary process for implementing automated employee selection.

FIG. 14A shows a first cycle 1402. For example, when an employer first begins to use a system, applicants enter pre-hire application and assessment responses using external data collection devices. The data can be stored and processed as described above, except that as of yet no behavioral predictions appear on the hiring report because a sufficient number of employee histories has not yet been captured by the system.

As employee job performance measures are taken, employees leave and complete exit interviews and their managers complete an exit evaluation, or payroll information is collected also using the external data collection devices, employee histories are added to the database. The rate of data accumulation is a function of how quickly people apply, are hired, and then terminate employment. An alternative to capturing post-hire job performance data upon termination is to collect similar data on the same population prior to termination on a concurrent basis. In the example, the size of the validation database is small, there is no adaptive learning, there are no predictive models, and there are no behavioral predictions.

Figure 14B:
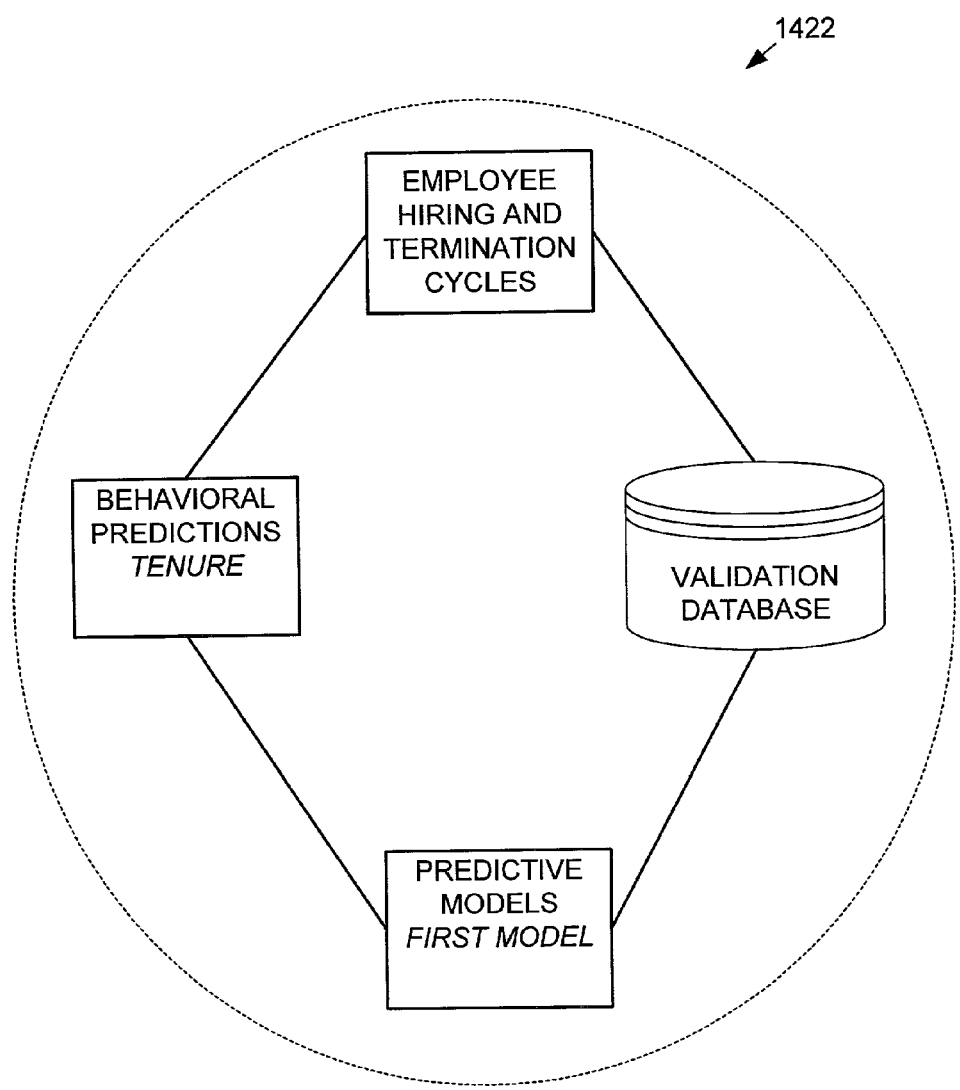

When a sufficient sample of employee histories is available, validation and predictive modeling can occur. Following model development, the second validation cycle 1422 can begin as shown in FIG. 14B. Ineffective pre-hire variables are dropped or replaced with new content and the pre-hire application is modified. Applicant and terminating employee processing continues and more employee histories are added to the database. In the example, the validation database is medium, there is at least one predictive model, and there is at least one behavioral prediction (e.g., length of service or tenure).

Figure 14C:
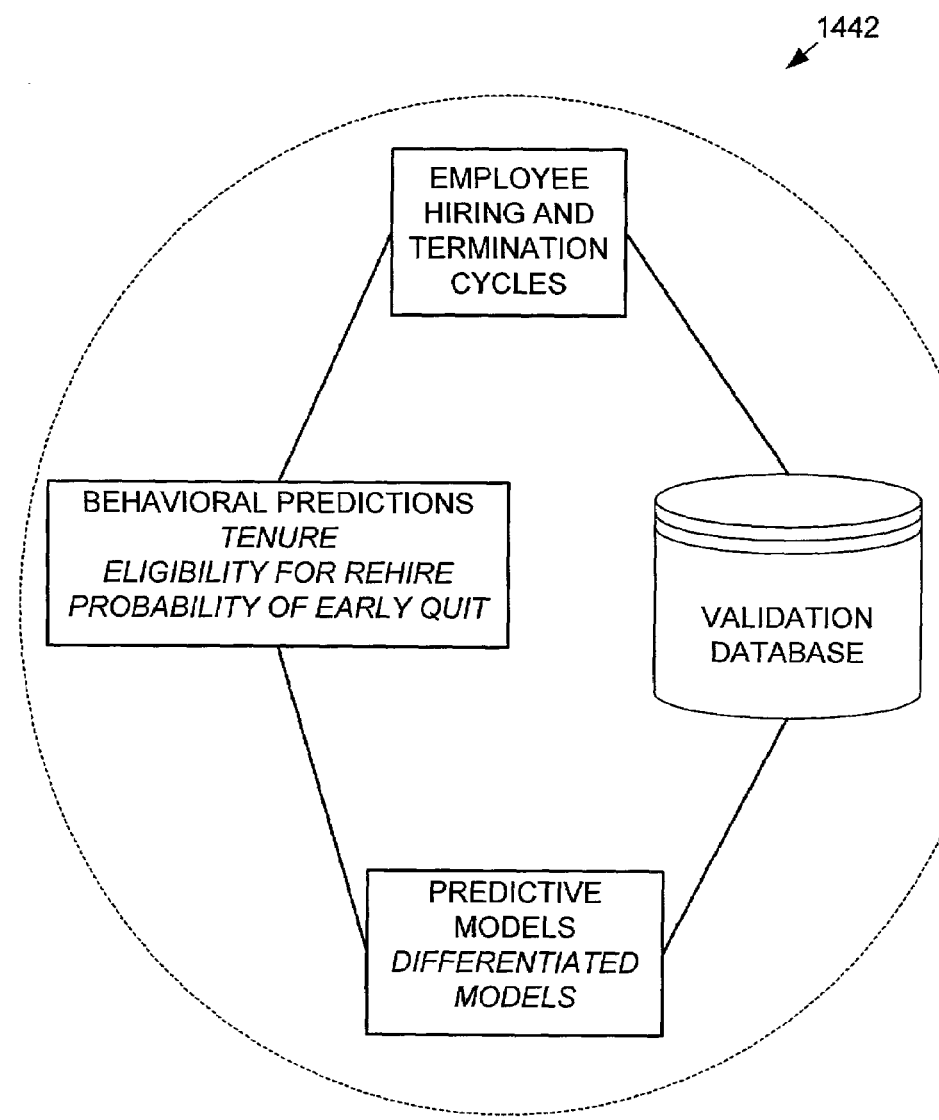

A third validation cycle 1442 is shown in FIG. 14C. Initially, predictive modeling might be limited to behavioral criteria commonly observed, such as length of service, rehire eligibility, or job performance ratings because sample sufficiency occurs first with such common measures. Other less frequently occurring data points (e.g., misconduct terminations) typically accumulate more slowly. As managers begin using the behavioral predictions to select new employees, the composition of the workforce can begin to change (e.g., newer employees demonstrate longer tenure, higher performance, and the like).

As usable samples are obtained for different criteria (e.g., post-hire outcomes), new models are developed to predict these behaviors. Older predictive models can be replaced or re-trained to incorporate both new item content from the item rotation procedure and additional criterion variation resulting from the expanding number of employee histories contained in the validation database. In the example, the validation database is large, there are differentiated models, and a number of behavioral predictions (e.g., tenure, early quit, and eligibility for rehire).

Figure 14D:
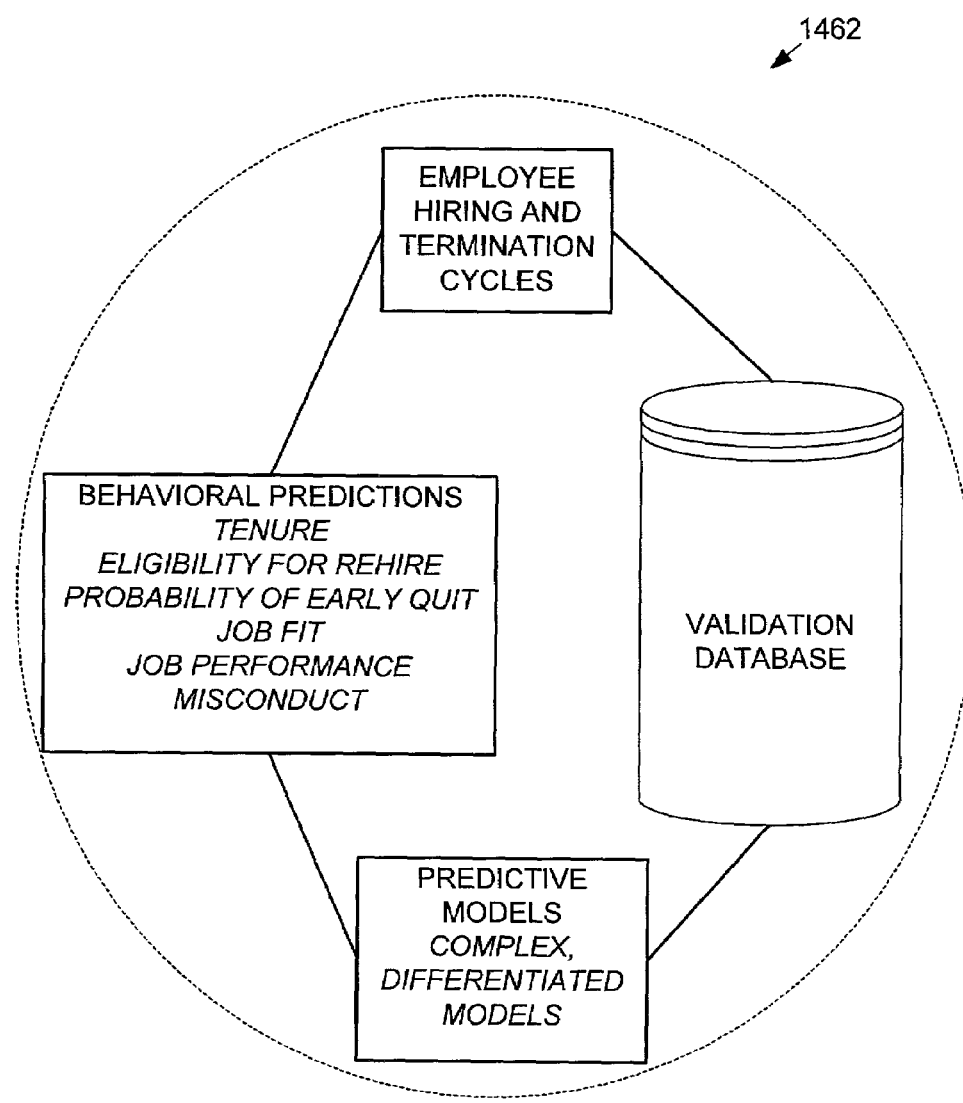

Fourth and subsequent validation cycles 1462 are shown in FIG. 14D. Multiple iterations of the validation cycle using larger and larger validation samples result in multiple complex models trained to produce sucessively-improving behavioral prediction across the spectrum of measurable job-related outcomes (e.g., eligibility for rehire, tenure, probable job performance, probability of early quit, job fit, misconduct, and the like). In the example, the validation database is very large, there are complex, differentiated models, and many behavioral predictions.

The behavioral predictions can become more accurate the longer the system is in place. If used consistently over time, the workforce may eventually be comprised entirely of employees selected on the basis of their similarity to successful former employees. Continued use of the adaptive learning employee selection technology can be expected to produce positive changes in the global metrics used to assess workforce effectiveness. Such metrics include lower rates of employee delinquency (e.g., theft, negligence, absenteeism, job abandonment, and the like), higher rates of productivity (e.g., sales, unit production, service delivery, and the like), longer average tenure and reduced employee turnover, and higher workforce job satisfaction and more effective employee placement.

EXAMPLE 32

Exemplary Process Overview

Figure 15:
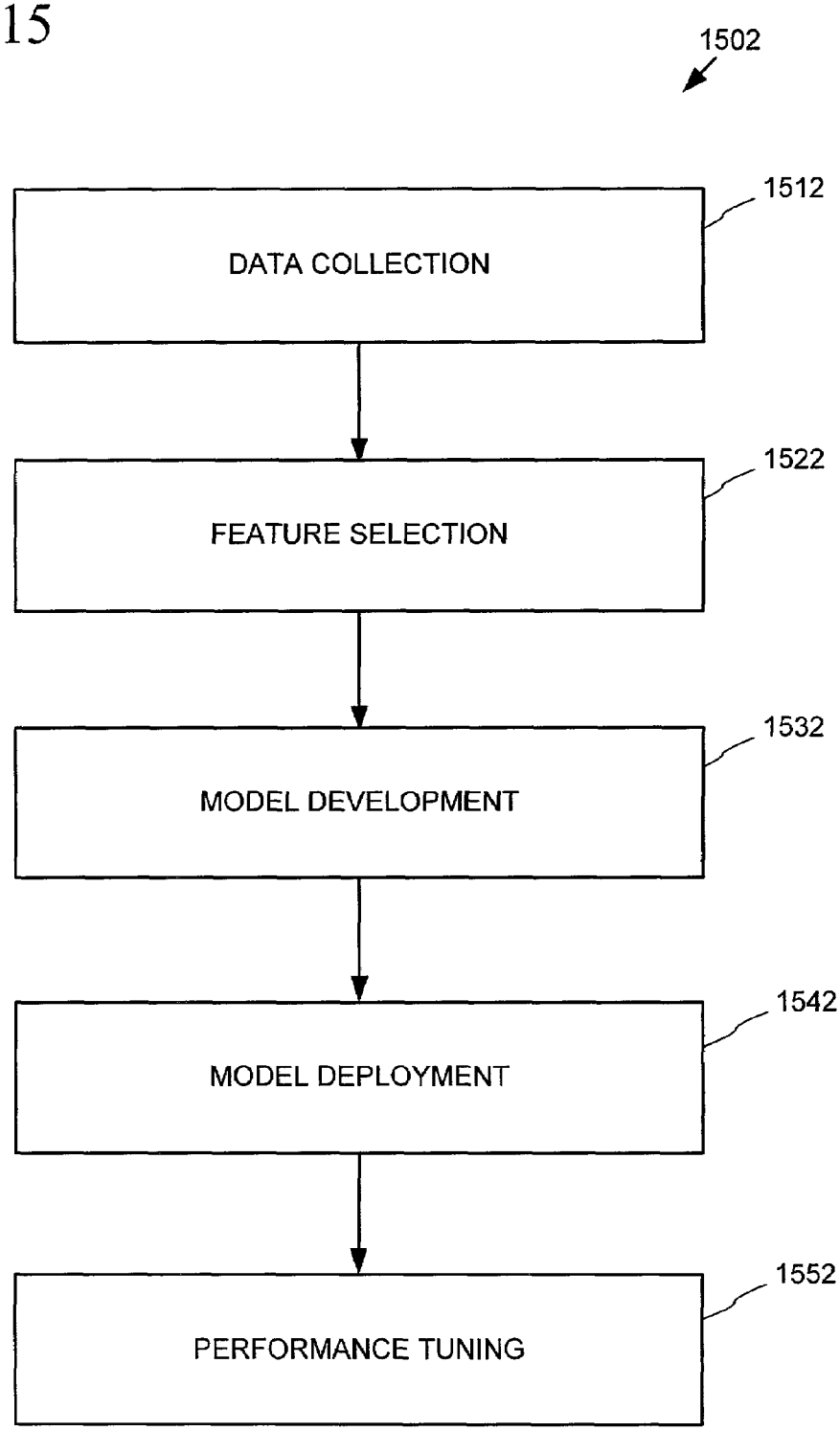
FIG. 15 is a process flow diagram illustrating an exemplary process for an employment suitability prediction system.

FIG. 15 is a process flow diagram illustrating an exemplary process 1502 for an employment suitability prediction system. At 1512, data is collected. Such collection can be accomplished in a wide variety of ways. For example, electronic data collection units can be distributed, or a URL can be used by employment applicants.

Electronic versions of a standard employment application or tests can be deployed. Also, post-hire data collection can be accomplished by deploying post-hire data collection questionnaires and via payroll data transfer. Also, manager feedback report apparatus (e.g., fax back reports or e-mail report of results) can be deployed so managers can receive information such as hiring recommendations. The service can then be implemented, and data collection can begin.

At 1522, feature selection can take place. Pre-hire application records can be extracted from an applicant processing system, and post-hire outcome data can be extracted from a reports database. Pre- and post-data can be sorted and matched from both sources to create a matched predictor-criterion set. Information theoretic feature selection can be run to identify top-ranking predictive items based on information transmission (e.g., mutual information). Item data characterized by marginal mutual information can be deleted and a distilled predictive modeling dataset can be saved.

At 1532, model development can take place. The distilled predictive modeling dataset can be randomized and partitioned into training, testing, and verification subsets. A group of models (e.g., neural networks) that meet performance criteria thresholds can be built by experimenting with multiple neural network paradigms, architectures, and model parameters.

The models can be tested for their ability to generalize (e.g., apply learned pattern information from training and test sets to the verification dataset). Non-generalizing models can be discarded and the surviving models can be saved.

Surviving models can be tested for differential prediction, adverse impact and other anomalies. Biased nets can be discarded. Unbiased models can be ranked and saved.

At 1542, model deployment can take place. The top-performing surviving model can be converted to software command code. The code can be integrated into a custom session processing task which executes model processing and exports the output to an imaging program and hiring report generator.

The new session processing task can be tested for appropriate handling and processing of the incoming data stream values in a software test environment. The session processing task code can be refined and debugged if necessary. Then, the new task can be deployed in an operational applicant processing system.

At 1552, performance tuning can take place. Data collection can continue. Sample size can be monitored as incoming data accumulates. When an update threshold is reached, new cases can be added to the matched predictor-criterion set by repeating feature selection 1522. Item content can be revised using a performance driven item rotation procedure (e.g., replace or remove survey items with marginal information transmission). Model development 1532, model deployment 1542, and performance tuning 1552 can then be repeated.

EXAMPLE 33

Effectiveness of a Model

Figure 16:
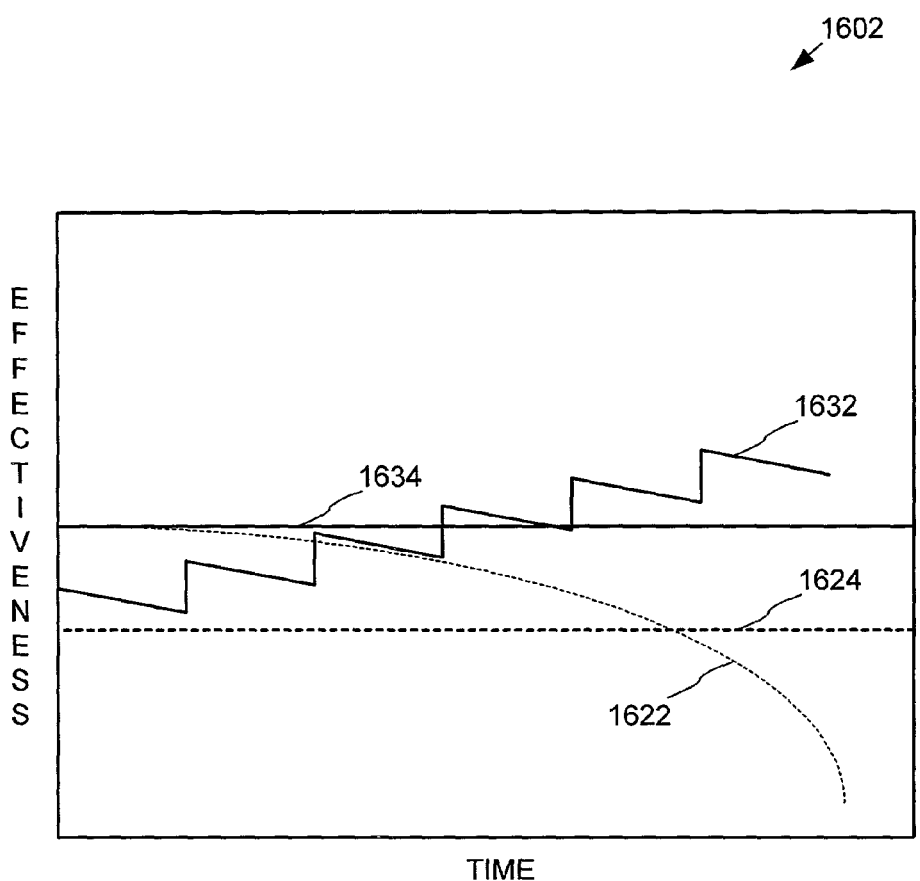
FIG. 16 is a graph illustrating exemplary effectiveness of a system over time.

Real-time electronic collection of data and sample size-driven refinement of models can result in high model effectiveness. For example, FIG. 16 shows a graph 16 in which effectiveness 1622 of a reference system is shown. As conditions change over time, the effectiveness 1622 of the system decreases. The mean effectiveness 1624 is also shown.

As system employing real-time electronic data collection and sample size-driven model refinement can exhibit the effectiveness 1632 as shown. As the model is refined, the effectiveness of the model increases over time. Thus, the mean effectiveness 1634 is greater, resulting in a more effective system.

EXAMPLE 34

Exemplary Automated Hiring Recommendation Service

Using various of the technologies, a method for providing an automated hiring recommendation service for an employer can be provided. Electronic devices can be stationed at employer sites (e.g., retail outlets). The electronic devices can directly accept pre-hire information from job applicants (e.g., answers to questions from a job application). The pre-hire information can then be sent to a remote site (e.g., via a network of telephone connection) for analysis. An artificial intelligence-based predictive model or other model can be applied to the pre-hire information to generate an automated hiring recommendation, which can be automatically sent to the employer (e.g., via email).

EXAMPLE 35

Exemplary Implementation

A behavioral prediction model can be developed to generate an estimate of the tenure (length of service in days) to be expected of applicants for employment as customer service representatives of a national chain of video rental stores. Such predictions can be based on the characteristics and behaviors of past employees in the same job at the same company. Application of the model can result in higher average tenure and lower employee turnover.

As a specific example, pre-hire application data used to develop this exemplary model was collected over a period of a year and a half using an electronic employment application as administered using screen phones deployed in over 1800 stores across the United States. Termination records of employees hired via the system were received by download. Over 36,000 employment applications were received in the reporting period, of which approximately 6,000 resulted in employment. Complete hire to termination records were available for 2084 of these employees, and these records were used to develop the model.

When building the model, definition of system inputs and outputs was accomplished. Independent or predictor variables can be measures of individual characteristics thought to be related to a behavior or outcome resulting from a behavior. In industrial psychology and employee selection, typical predictor variables might be measures of education, experience or performance on a job-related test. Criterion variables can be measures of the behavior or outcome to be predicted and might include sales effectiveness, job abandonment, job performance as measured by supervisor ratings, employee delinquency and other behavioral metrics or categories.

In this example, predictor variables are inputs and criterion variables are outputs. In this research, input variables consist of a subset of the employment application data entered by applicants when applying for jobs (see Tables 4 and 5 for a listing of the variables used in this model). The output or criterion is the number of days that an employee stayed on the payroll.

The process of identifying the subset of predictor variables to be used in a model is sometimes called "feature selection." While any information gathered during the employment application process may have predictive value, the set of predictors is desirably reduced as much as possible. The complexity (as measured by the number of network connections) of a network can increase geometrically with the number of inputs. As complexity increases so can training time along with the network's susceptibility to over-training. Therefore inputs with less predictive power can be eliminated in favor of a less complex neural network model.

For the tenure prediction model in this illustrative example, information theoretic methods were employed to determine the subset of input variables that maximized information transmission between the predictor set and the criterion. Such an approach can rely on the statistical theory of independent events, where events $p_1, P_2, \ldots, p_n$ are considered statistically independent if and only if the probability P, that they occur on a given trial is $$P = \prod_{i=1}^{n} p_i \qquad (1)$$

Conversely, the measurement of how much a joint distribution of probabilities differs from the independence distribution can be used as a measure of the statistical dependence of the random events.

Figure 17:
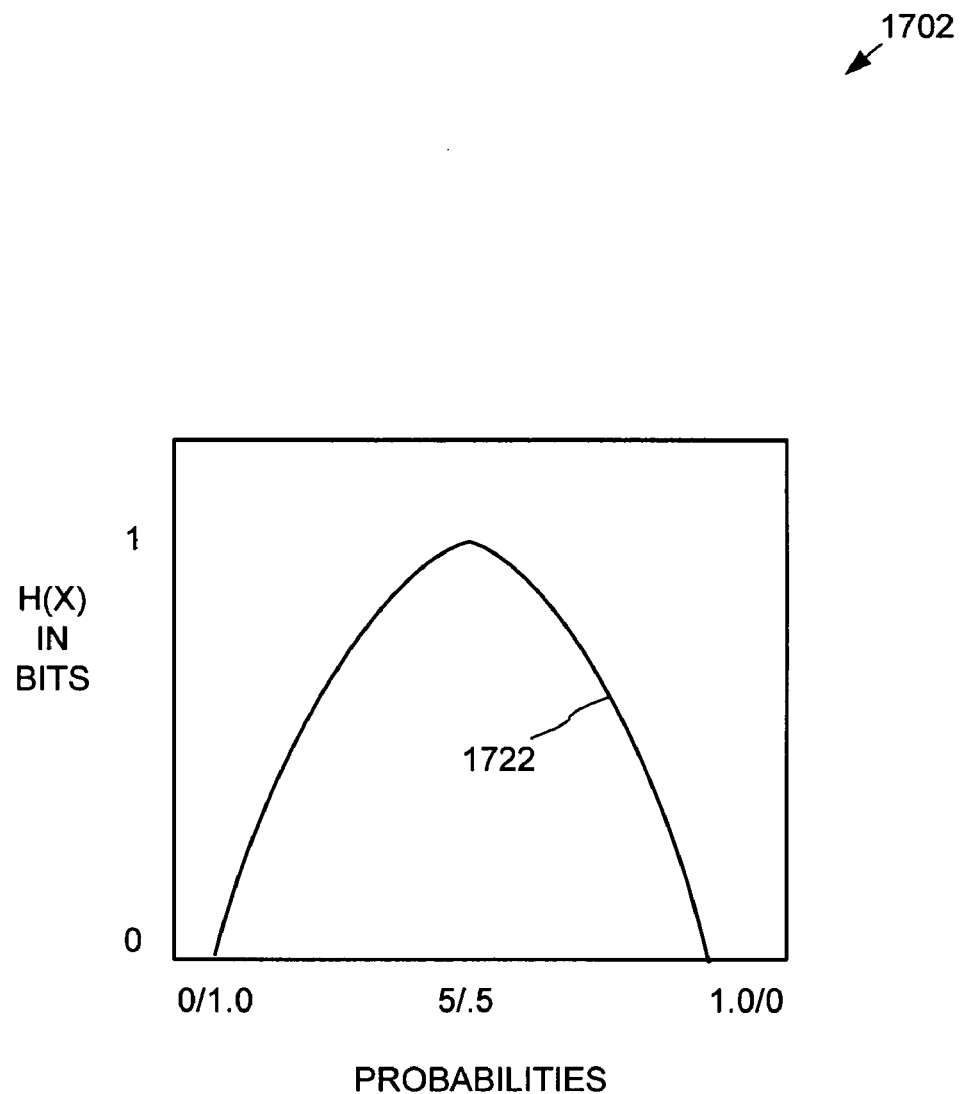
FIG. 17 is a graph illustrating entropy.

Information theoretic entropy can provide a convenient metric for estimating the difference between distributions. The entropy, H(X) (measured in bits) of the distribution of a discrete random variable X with n states can be $$H(X) = -\sum_{i=1}^{n} p_i \log_2 p_i \qquad (2)$$

where $p_i$ is the probability of state i. Entropy can be maximized when a distribution is uniform. For example, FIG. 17 shows a graph 1702 of the entropies 1722 of a single variable, discrete 2-state distributions and how their probabilities vary.

Similarly, for a multivariate distribution constrained by specified marginal distributions, the distribution that maximizes entropy can be the independence distribution. Therefore, given a joint distribution with fixed marginals, the distribution that minimizes entropy can be the distribution for which the variables are completely dependent. Dependence can be viewed as constraint between variables and as constraint is reduced, entropy increases. Information theoretic analysis of a distribution is then the measurement of constraint. Decreasing entropy can indicate dependence (minimal entropy, maximum constraint), and increasing entropy can indicate independence (maximum entropy, minimum constraint). Assuming some constraint between variables, sampled distribution can lie somewhere between complete dependence and independence and have a measurable entropy.

If we are analyzing the joint distribution of the variables X and Y, the entropy for this sampled distribution can be H(XY). The entropies of the variables X and Y measured separately are H(X) and H(Y) and can be computed using the marginals of the joint distribution.

Since H(X) and H(Y) are calculated from the marginals and entropy can be logarithmic, $$H(X)+H(Y)=H(XY) \qquad (3)$$

if there is no constraint between X and Y.

Or:

$$H(XY)=H(X)+H(Y) \qquad (4)$$

if and only if X and Y are independent.

This equality can indicate that there is no relationship between X and Y and the joint distribution of the variables is the independence distribution.

Information transmission T can be the measure of the distance between distributions along the continuum described above. For discrete random variables X and Y, T(X:Y) the information transmission between X and Y, is computed:

$$T(X:Y)=H(X)+H(Y)-H(XY) \qquad (5)$$

T(X:Y) is the difference between the entropies of the independence distribution and the sampled joint distribution. The degree of dependence between X and Y can therefore be computed by measuring information transmission. A small value for T(X:Y) indicates the variables X and Y are nearly independent, whereas a large value suggests a high degree of interaction.

In a directed system, such as a predictive model, the measure of information transmission between the distribution of an independent variable X and a dependent variable Y can be used to gauge the predictive value of X. The goal can be to find a subset S of the independent variables V such that, for the set of dependent variables D:

$$T(D:V) \approx T(D:S) \qquad (6)$$

However, as discussed, the modeling technique to be employed may limit the cardinality of S so the filtering process can be guided by the following considerations:

1. if S' is any subset of V smaller than S, then T(D:S') is significantly smaller than T(D:S).
2. if S' is any subset of V larger than S, then T(D:S') is not significantly larger than T(D:S)

Since information theoretic transmission can measure the degree of difference between distributions of variables, without regard to the nature of the difference, the technique can be considered "model free". This property allows the methodology to work as an effective filter regardless of the subsequent modeling techniques employed.

When this type of feature selection was applied to tenure prediction, 56 questions (see Tables 4 and 5) were selected has having the most predictive value with respect to applicant tenure.

Once the set of predictor variables or inputs has been defined and the output criterion variable specified, a neural network model can be trained. For the tenure prediction model, 2084 cases were available. This sample was divided into training, test and verification sets. The training set contained 1784 cases and the verification and test sets contained 150 cases each.

The best performing neural network architecture was found to be a single hidden layer feed-forward network with 56 input nodes and 40 hidden layer nodes.

The network was developed with the STATISTICA Neural Network package using a combination of quick-propagation and conjugate gradient training.

The performance on the training and verification sets began to diverge significantly after 300 epochs. This was deemed to be the point of over-training. Optimal performance on the hold-out sets was achieved at 100 epochs. The results are shown in Table 3, which contains final distribution statistics of model output for each of the three data subsets. Unadjusted correlation and significance statistics are in relation to actual tenure. By any standard, an employee selection procedure with a correlation in the 0.5 range with a job-related criteria is not merely acceptable, but exceptional. Many validated selection procedures in use today were implemented on the basis of validity coefficients in the range of 0.2 to 0.3.

TABLE 3

Summary Statistics of Model Output

|  | Train | Verify | Test |
|---|---|---|---|
| Data Mean | 73.42657 | 82.89333 | 71.03333 |
| Data S.D. | 70.92945 | 71.22581 | 62.16501 |
| Error Mean | −0.4771 | −7.2582 | 7.440303 |
| Error S.D. | 60.84374 | 60.93211 | 53.80157 |
| Correlation | 0.514349 | 0.51901 | 0.503975 |
| Significance | 0.000 | 0.000 | 0.000 |

Based on the correlation between prediction and the hold-out sets, the expected correlation between predictive model output and actual tenure for future applicants should be in the range of 0.5.

As described in the example, information theoretic feature selection was used to identify fifty-six biodata and personality assessment item responses that were related to employee tenure in a sample of over two thousand employees at a national video rental chain. The data was collected via interactive electronic survey administration on a network of screen phones deployed in many regions of the U.S.

A fully-connected, feed-forward backpropagation neural network was trained to produce an estimate of tenure in days using these fifty-six predictor variables (e.g., answers to the questions) as inputs. Network architecture consisted of 56 input neurons or nodes, a hidden layer of forty nodes and one output node. Conjugate gradient descent training resulted in convergence between training and test set minimum error in about 300 iterative training exposures to the data. Model performance on an independent hold-out sample obtained a statistically significant correlation of 0.5 with actual tenure. These results are well within the range of acceptable performance for a criterion-referenced employee selection procedure and represent a significant improvement over many systems.

In the example, based on information theoretic analysis, the responses to the questions shown in Tables 4 and 5 were deemed to be the most predictive. The following descriptions are the questions in their entirety accompanied by the possible responses.

To determine that these questions were the most predictive, information theoretic analysis of the joint distribution of the response (alone or together with other responses) and the dependent variable, tenure, was performed. The nature of the relationship between a specific response and the Criterion variables may not be known, however the predictive success of the neural model suggests this relationship has, to some degree, been encoded in the weight matrix of the neural network.

TABLE 4

Pre-hire Content Examples

1. How long do you plan to stay with this job if hired?
    1 - Less than 6 months
    2 - 6-12 months
    3 - More than 1 year
2. Have you ever worked for this employer before?
    1 - Yes
    2 - No
3. Reason for leaving? (if previously employed by this employer)
4. Which type of position do you desire?
    1 - Store Director
    2 - Assistant Director
    3 - Customer Service Representative

TABLE 4-continued

Pre-hire Content Examples

4 - Shift Leader
    5 - Let's Discuss
5. What do you expect to earn on an hourly basis? (hourly wage given)
6. Desired Schedule?
    1 - Regular (not seasonal)
    2 - Seasonal
7. Desired Hours?
    1 - Full time
    2 - Part time
8. When would you be available to start?
    1 - Right Away (within the next day)
    2 - Specific Date (if not available to start within the next day)
9. Highest Education Level?
    1 - 2 Years of College or Less:
        1 - Not indicated
        2 - Less than HS Graduate
        3 - HS graduate or equivalent
        4 - Some college
        5 - Technical School
        6 - 2-year college degree
    2 - More than 2 years of college
        1 - Bachelor's level degree
        2 - Some graduate school
        3 - Master's level degree
        4 - Doctorate (academic)
        5 - Doctorate (professional)
        6 - Post-doctorate
        7 - Degree not completed
        8 - 2-year college degree
10. What was your reason for leaving? (last job)
    1 - Voluntarily quit
    2 - Involuntarily terminated
    3 - Laid off
    4 - Still there
11. What was/is your job title? (last job)
    1 - Cashier
    2 - Stock person
    3 - Customer Service Representative
    4 - Management
    5 - Other
12. Please describe the area you worked in. (last job)
    1 - Apparel
    2 - Inventory
    3 - Customer service
    4 - Food service
    5 - Operations
    6 - Computers/Electronics
    7 - Merchandising
    8 - Personnel
    9 - Other
13. What was/is you supervisor's last name? (given or not given)
14. May we contact this employer?
    1 - Yes
    2 - No
15. What was your reason for leaving? (prior job)
    1 - Voluntarily quit
    2 - Involuntarily terminated
    3 - Laid off
    4 - Still there
16. What was/is your job title? (prior job)
    1 - Cashier
    2 - Stock person
    3 - Customer Service Representative
    4 - Management
    5 - Other
17. Please describe the area you worked in. (prior job)
    1 - Apparel
    2 - Inventory
    3 - Customer service
    4 - Food service
    5 - Operations
    6 - Computers/Electronics
    7 - Merchandising
    8 - Personnel
    9 - Other TABLE 4-continued Pre-hire Content Examples 18. What was/is you supervisor's last name? (prior job)
    (given or not given)
19. May we contact this employer? (prior job)
    1 - Yes
    2 - No
20. What was your reason for leaving? (prior to prior job)
    1 - Voluntarily quit
    2 - Involuntarily terminated
    3 - Laid off
    4 - Still there
21. What was/is your job title? (prior to prior job)
    1 - Cashier
    2 - Stock person
    3 - Customer Service Representative
    4 - Management
    5 - Other
22. Please describe the area you worked in. (prior to prior job)
    1 - Apparel
    2 - Inventory
    3 - Customer service
    4 - Food service
    5 - Operations
    6 - Computers/Electronics
    7 - Merchandising
    8 - Personnel
    9 - Other
23. What was/is you supervisor's last name? (prior to prior job)
    (given or not given)
24. May we contact this employer? (prior to prior job)
    1 - Yes
    2 - No
25. Academic Recognitions?
    (listed or not listed)
26. Other Recognitions?
    (listed or not listed)
27. Have you previously applied for employment at this employer?
    1 - Yes
    2 - No
28. Referral Source
    1 - Referred to this employer by Individual or Company
        1 - Agency
        2 - Client Referral
        3 - College Recruiting
        4 - Employee Referral
        5 - Former Employee
        6 - Executive Referral
        7 - Executive Search
    2 - Other Source of Referral
        1 - Advertisement
        2 - Job Fair
        3 - Job Posting
        4 - Open House
        5 - Other Source
        6 - Phone Inquiry
        7 - Unknown
        8 - Unsolicited
        9 - Walk In
29. Last name of referral
    (listed or not listed)
30. Any other commitments?
    (listed or not listed)
31. Any personal commitments?
    (listed or not listed)

The possible responses to the question of Table 5 are as follows: "1—It is definitely false or I strongly disagree, 2—It is false or I disagree, 3—It is true or I agree, 4—It is definitely true or I strongly agree."

TABLE 5

Pre-hire Content Examples (e.g., Hourly Workers)

1. You have confidence in yourself.
2. You are always cheerful.
3. You get mad at yourself when you make mistakes.
4. You would rather work on a team than by yourself.
5. You try to sense what others are thinking and feeling.
6. You can wait patiently for a long time.
7. When someone treats you badly, you ignore it.
8. It is easy for you to feel what others are feeling.
9. You keep calm when under stress.
10. You like to be alone.
11. You like to talk a lot.
12. You don't care what people think of you.
13. You love to listen to people talk about themselves.
14. You always try not to hurt people's feelings.
15. There are some people you really can't stand.
16. People who talk all the time are annoying.
17. You are unsure of yourself with new people
18. Slow people make you impatient.
19. Other people's feelings are their own business.
20. You change from feeling happy to sad without any reason.
21. You criticize people when they deserve it.
22. You ignore people you don't like.
23. You have no big worries.
24. When people make mistakes, you correct them.
25. You could not deal with difficult people all day.

EXAMPLE 36

Exemplary Implementation Using Information-Theoretic Feature Selection

Information-theoretic feature selection can be used to choose appropriate inputs for a model. In the following example, the source for the data used to develop the model was a large national video rental company. The sample contains over 2000 cases, with 160 responses to application questions collected prior to hiring and tenure (in days) for former employees. The model was constructed to predict the length of employment for a given applicant, if hired.

The application itself consists of 77 bio-data questions (e.g., general, work related, information, job history, education and referrals questions) and 83 psychometric questions. The psychometric assessment portion was designed to predict the reliability of an applicant in an hourly, customer service position. For the purposes of model development, each question response was treated as a single feature and the reliability score was not provided to the neural network or feature selection process. While any information gathered during the application process may have predictive value, the set of input variables (independent variables or "IVs") can be reduced. Possible justifications are as follows:

1. Not all potential IVs may have significant predictive value. The use of variables with little or no predictive value as inputs can add noise. Adding IVs to the model which cannot improve predictive capability may degrade prediction since the network may need to adapt to filter these inputs. This can result in additional training time and neural resources.

2. Predictive models can provide a mapping from an input space to an output space. The dimensionality of this input space increases with the number of inputs. Thus, there are more parameters required to cover the mapping which in turn increases the variance of the model (in terms of the bias/variance dilemma); such a problem is sometimes referred to as the "curse of dimensionality."

IVs with less predictive power can be eliminated in favor of a less complex neural network model by applying feature selection. Such methods fall into two general categories: filters and wrappers, either of which can be used.

1. Wrappers can use the relationship between model performance and IVs directly by iteratively experimenting with IV subsets. Since the nature of the bias of the feature selection method matches that of the modeling technique, this approach can be theoretically optimal if the search is exhaustive.

The exhaustive application of wrappers can be computationally overwhelming for most modeling problems since the number of possible subsets is $$\binom{n}{k} = \frac{n!}{k!(n-k)!} \qquad (7)$$

where n is the total number of IVs and k is the cardinality of the subset of features.

Additionally, there can be non-determinism within the modeling process. In neural modeling, though training algorithms are typically deterministic, random initialization of the weight parameters varies the results of models developed with the same inputs. Therefore, even exhaustive trials may not prove conclusive with respect to estimating the predictive value of a set of features.

2. Filters can analyze the relationship between sets of IVs and dependent variables (DVs) using methods independent of those used to develop the model.

The bias of the filter may be incompatible with that of the modeling technique. For example, a filter may fail to detect certain classes of constraint, which the subsequent modeling stage may utilize. Conversely, the filter may identify relations which cannot be successfully modeled. Ideally, a filter can be completely inclusive in that no constraint which might be replicated by the subsequent modeling stage would be discarded.

Information-theoretic feature selection can make use of the statistical theory of independent events. Events $P_1, P_2, \ldots, P_n$ are considered statistically independent if and only if the probability P, that they all occur on a given trial is $$P = \prod_{i=1}^{n} p_i \qquad (8)$$

The degree to which a joint distribution of probabilities diverges from the independence distribution may be used as a measure of the statistical dependence of the events.

Information-theoretic entropy can provide a convenient metric for quantifying the difference between distributions. The entropy, H(X) (measured in bits), of the distribution of a discrete random variable, X, with n states can be $$H(X) = -\sum_{i=1}^{n} p_i \log_2 p_i \qquad (9)$$

where $p_i$ is the probability state i.

Entropy can be maximized when a distribution is most uncertain. If a distribution is discrete, this occurs when it is uniform. FIG. 17 shows a graph of the entropies of a single variable, 2-state distribution as the state probabilities vary.

For a multivariate distribution constrained by fixed marginals, the distribution which maximizes entropy can be the independence distribution (calculated as the product of the marginals). The distribution which minimizes entropy can be the distribution for which the variables are completely dependent.

Dependence can be constraint between variables, so as constraint is reduced, entropy increases. Information-theoretic analysis can therefore be used to measure constraint. For a joint distribution of discrete variables, X and Y, the total entropy, H(XY) can be $$H(XY) = -\sum_{i,j} p_{ij} \log_2 p_{ij} \qquad (10)$$

where $p_{ij}$ is the probability of state i,j occurring in the joint distribution of X and Y, where i designates the state of X and j is the state of Y. The entropies of X and Y are computed with the marginals of the joint distribution $$H(X) = -\sum_{i} \left(\sum_{j} p_{ij}\right) \log_2 \left(\sum_{j} p_{ij}\right) \qquad (11)$$

$$H(Y) = -\sum_{j} \left(\sum_{i} p_{ij}\right) \log_2 \left(\sum_{i} p_{ij}\right) \qquad (12)$$

Information transmission (or "mutual information") can be the measure of the distance between the independence and observed distributions along the continuum discussed above. For X and Y, T(X:Y) (the information transmission between X and Y), is computed $$T(X:Y) = H(X) + H(Y) - H(XY) \qquad (13)$$

In a directed system, the measure of information transmission between the distribution of an independent variable X and a dependent variable Y is a gauge of the predictive value of X. H(X)+H(Y)=H(XY) if and only if there is no constraint between X and Y, in which case X would be a poor predictor for Y.

In order for a computed transmission value, T, to be considered an accurate measure of existing constraint, the statistical significance of T for some confidence level, α, can be determined using the $\chi^2$ test. The degrees of freedom (df) for a transmission, T(X:Y), can be calculated $$df_{T(XY)} = df_{XY} - df_X - df_Y \qquad (14)$$

As the size of the joint distribution increases, so does the df for the significance of the transmission value. Since $\chi^2$ significance decreases as df increases, the data requirements for transmissions containing a large number of variables can quickly become overwhelming.

A superior feature set can be determined. A goal can be to discover a subset S of the independent variables V that has the same predictive power as the entire set with respect to the dependent variables, D.

$$T(V:D) \approx T(S:D) \qquad (15)$$

The filtering process can therefore be guided by the following:
1. if S' is any subset of V smaller than S, then T(S':D) is significantly smaller than T(S:D).
2. if S' is any subset of V larger than S, then T(S':D) is not significantly larger than T(S:D).

Higher-order interactions are synergies between variables where the predictive power of a set of variables is significantly higher than that of the sum of the individual variables. In terms of information transmission for the IVs $X_1, \ldots, X_n$, and dependent variable D, this is represented, $$T(X_1:D) + \ldots + T(X_n:D) < T(X_1, \ldots, X_n:D) \quad (16)$$

An illustration of this phenomenon among discrete binary variables: A, B and C, is shown by the contingency table in Tables 6A and 6B.

TABLE 6A

Contingency Table for Distribution ABC, C = 0

|       | B = 0 | B = 1 |
|-------|-------|-------|
| A = 0 | 1/4   | 0     |
| A = 1 | 0     | 1/4   |

TABLE 6B

Contingency Table for Distribution ABC, C = 1

|       | B = 0 | B = 1 |
|-------|-------|-------|
| A = 0 | 0     | 1/4   |
| A = 1 | 1/4   | 0     |

For the illustrated system, the following transmissions are computed:

$$T(A:C) = H(A) + H(C) - H(AC) = 0 \text{ bits}$$

$$T(B:C) = H(B) + H(C) - H(BC) = 0 \text{ bits}$$

$$T(AB:C) = H(AB) + H(C) - H(ABC) = 1 \text{ bit}$$

Knowledge of A or B individually does not reduce the uncertainty of C, but knowledge of A and B eliminates uncertainty since only one state of C is possible. With only first order transmissions values, A and B would not appear to be predictive features, when in fact, together they are ideal.

Higher order interactions were observed in the video clerk tenure data. Table 7 lists the top ten single variable transmissions between the psychometric questions and tenure. Table 8 shows the top five, two and three variable transmissions. Each of the most predictive sets of questions (based on transmission values) in both the second and third order lists, T(q35 q73:tenure) and T(q4 q12 q39:tenure), contain only one question from the top ten most predictive questions based on first order transmissions.

TABLE 7

Single Order Transmissions Between Psychometrics and Tenure

| variables   | trans. | % H(DV) | df | $\chi^2$sig. |
|-------------|--------|---------|-----|--------------|
| T(q83:tenure) | 0.0168 | 0.754 | 27 | 0.999 |
| T(q3:tenure)  | 0.0140 | 0.628 | 27 | 0.991 |
| T(q63:tenure) | 0.0135 | 0.607 | 27 | 0.987 |
| T(q65:tenure) | 0.0133 | 0.598 | 27 | 0.985 |
| T(q48:tenure) | 0.0133 | 0.595 | 27 | 0.984 |
| T(q44:tenure) | 0.0132 | 0.593 | 27 | 0.984 |
| T(q35:tenure) | 0.0128 | 0.573 | 27 | 0.977 |
| T(q21:tenure) | 0.0127 | 0.569 | 27 | 0.975 |
| T(q8:tenure)  | 0.0123 | 0.553 | 27 | 0.967 |
| T(q69:tenure) | 0.0123 | 0.552 | 27 | 0.966 |

TABLE 8

Higher (second and third) Order Transmissions between Psychometrics and Tenure

| variables | trans. | % H(DV) | df | $\chi^2$sig. |
|-----------|--------|---------|-----|--------------|
| T(q35 q73:tenure) | 0.0593 | 2.663 | 135 | 1.00 |
| T(q21 q83:tenure) | 0.0588 | 2.639 | 135 | 1.00 |
| T(q39 q65:tenure) | 0.0585 | 2.627 | 135 | 1.00 |
| T(q61 q70:tenure) | 0.0569 | 2.553 | 135 | 0.999 |
| T(q44 q53:tenure) | 0.0567 | 2.546 | 135 | 0.999 |
| T(q4 q12 q39:tenure) | 0.1808 | 8.112 | 567 | 0.921 |
| T(q10 q39 q65:tenure) | 0.1753 | 7.864 | 567 | 0.811 |
| T(q4 q39 q44:tenure) | 0.1720 | 7.718 | 567 | 0.712 |
| T(q4 q39 q51:tenure) | 0.1718 | 7.709 | 567 | 0.705 |
| T(q52 q61 q70:tenure) | 0.1717 | 7.702 | 567 | 0.700 |

Such interactions can complicate the search for the optimal set S since the members of V may not appear as powerful predictors in calculated transmissions using sets of features of cardinality less than |S| (the cardinality of the optimal subset S).

Due to issues of $\chi^2$ significance, it is frequently overwhelming to calculate significant transmission values for sets of variables of cardinality approaching |S|. Additionally, since the number of subsets of a given cardinality soon become very large, even if the significance issues were addressed, computational limitations would persist.

In feature selection algorithms that approximate an exhaustive search for S by computing only pairwise transmissions, higher-order interaction effects are not detected. Such methods may not accurately approximate S since only variables which are strong single variable predictors will be selected.

Based on the following guidelines, heuristics were applied in an effort to address the problems of combinatorics and significance in measuring higher-order relations.

Although it is possible for members of the optimal subset of IVs, S, to be completely absent from all large lower order transmissions, this is probably unlikely. An omission can be increasingly unlikely as the order of the transmissions calculated approaches |S|. It is therefore likely that significant members of S will appear in the top n transmissions of the highest order transmission computed, where n is sufficiently large. Thus, as n→|S|, the union of the set of IVs appearing in the most predictive transmissions will probably approach S.

With these guidelines, a process for generating an approximation to S (S') given the set V of significant IVs and the set D of all DVs, can be presented.

In the following process (1–6), $T_k$ will be used to denote the set of transmissions of order k (containing k IVs) from a set of n features.

1. Calculate the transmissions, $T_k$ for the highest order, k, for which the $$\binom{n}{k}$$

transmissions may be calculated.

2. Choose the m unique transmissions of the greatest magnitude from $T_k$ to be the base set for higher-order transmissions.

3. Generate $T'_{k+1}$ by adding the IV to numbers of $T_k$ which generates the set $T_{k+1}$ with the largest transmission values. Note that $T'_{k+1}$ is a subset of $T_{k+1}$ since it contains only those members of $T_{k+1}$ which can be generated from $T_k$ by adding one independent variable to each transmission.

4. Discard any duplicate transmissions.

5. Repeat Steps 3 and 4 until $\chi^2$ significance is exhausted.

6. Take the union of the variables appearing in as many of the most predictive transmissions as is necessary to generate a set of size |S|. This union is S', the approximation of the set S.

Since |S| is unknown, this value is estimated. However, $0 \leq |S| \leq |V|$, so it is often feasible to experiment with the S' for each cardinality.

An issue raised by feature selection processes is the effect of dependence between members of S'. This dependence may be viewed as the redundancy in the predictive content of the variables. One solution proposed is to calculate the pairwise transmissions $T(s'_i: s'_j)$, between features $s'_i$ and $s'_j$, from a candidate S'. Features which exhibit high dependence (high pairwise transmissions) are penalized with respect to the likelihood of their inclusion in the final S'.

Dependence between features is dealt with implicitly in the process above since such dependence will reduce the entropy, thereby reducing the magnitude of the transmission between a set of features and the set of dependent variables. Highly redundant feature sets will have low transmission values relative to less redundant sets of the same cardinality and will therefore be less likely to contribute to S'.

While tenure in days is a discrete measure, the number of possible states makes it difficult to use the variable without transformation since a large number of states makes the joint distribution sparse (high df relative to the data population) and any transmissions calculated statistically insignificant. Since tenure is an ordered variable, applying a clustering algorithm was not problematic.

Clustering is a form of compression, so care can be taken to minimize information loss. The clustering phase was guided by efforts to maximize the entropy of the clustered variable within the confines of the needs of statistical significance.

Though transmission values did vary across clustering algorithms and granularity, the results in terms of S' were consistent.

Transmissions were calculated by combining cluster analysis and information-theoretic analysis. For the video clerk data set (containing 160 IVs) it was decided that the cardinality of the sets of IVs for which transmissions could be calculated was 4. From there, two additional orders of cardinality were calculated by supplementing the 4th order transmissions (as described in step 3 of the process). The union of independent variables appearing in the largest transmissions was taken to be S'. Experimentation with neural models using S' of different cardinalities yielded the best results when |S'|=56.

An interesting aspect of the application questions chosen by the feature selection method was the mix of bio-data and psychometrics. Of the 56 features used as inputs for the most successful model, 31 came from the bio-data section of the application and 25 came from the psychological assessment. Of particular interest was the "coupling" of certain bio-data and assessment questions. Such pairs would appear together throughout the analysis of transmission over a range of cardinalities. (e.g., they would appear as a highly predictive pair and would subsequently appear together in higher-order sets of IVs).

The synergistic effect between the two classes of question became apparent when models were generated using exclusively one class or the other (using only psychometrics or only bio-data questions). With comparable numbers of inputs, these models performed significantly worse than their more diverse counterparts. These results are particularly interesting since psychological assessments typically do not include responses from such diverse classes of questions.

In the example, the most successful neural model developed was a single hidden layer, feed-forward neural network with 56 inputs (|S'|=56), slid 40 hidden nodes. The network was trained using the conjugate gradient method. Of the total data set size of 2084, 1784 were allocated to the training set and 300 were "hold-out".

The performance measures of behavioral prediction models can be measured using the correlation coefficient. For the neural model described, the correlation between prediction and actual tenure for the hold-out sample was p=0.51. For comparison, a number of other models were generated using either no feature selection or alternate feature selection methods. These models used the same network architecture and training algorithm. The best model generated using the entire data set (e.g., all features), was a 160-90-1 configuration (160 inputs and 90 hidden layer nodes) which achieved a maximum hold-out correlation of p=0.44. Alternate feature selection algorithms: genetic algorithms, and forward and reverse stepwise regression, using the same number of features (56), failed to achieve a hold-out correlation better than p=0.47.

Information-theoretic feature selection is a viable and accurate method of identifying predictors of job performance in employee selection. The capacity to identify non-linear and higher-order interactions ignored by other feature selection methods represents a significant technique in constructing predictive models.

Alternatives

It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa. In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. An apparatus for assisting in determining suitability of an individual for employment by an employer, the apparatus comprising:
- an electronic data interrogator operable to present a first set of a plurality of questions to the individual;
- an electronic answer capturer operable to electronically store answers by the individual to at least a selected plurality of the first set of questions presented to the individual;
- an electronic predictor responsive to the stored answers and operable to predict at least one post-hire outcome for at least one job performance criterion if the individual were to be employed by the employer, the predictor providing a prediction of the at least one post-hire outcome for the at least one job performance criterion based upon correlations of the stored answers with answers to sets of questions by other individuals for which post-hire information has been collected; and
- an electronic results provider providing an output indicative of the at least one post-hire outcome for the at least one job performance criterion to assist in determining suitability of the individual for employment by the employer;
- wherein the first set of the plurality of questions to the individual has been subjected to performance-driven item rotation comprising at least one validation cycle during which at least one of the questions has been retained, at least one former question has been dropped, and at least one experimental question has been inserted.

2. The apparatus of claim 1 wherein the electronic predictor comprises a predictive model from which an ineffective predictor has been removed as a result of identifying the ineffective predictor via software, wherein the ineffective predictor is for an ineffective question.

3. The apparatus of claim 1 further comprising a validation database stored in a computer-readable storage medium and comprising employee histories comprising post-hire job performance data;
- wherein the electronic predictor has been subjected to a plurality of successive validation cycles, the successive validation cycles achieved via the post-hire job performance data in the validation database and validating effectiveness of answers to the questions presented by the electronic data interrogator in accurately predicting the post-hire outcome for the least one job performance criterion.

4. An apparatus for assisting in determining suitability of an individual for employment by an employer, the apparatus comprising:
- an electronic data interrogator operable to present a first set of a plurality of questions to the individual;
- an electronic answer capturer operable to electronically store answers by the individual to at least a selected plurality of the first set of questions presented to the individual;
- an electronic predictor responsive to the stored answers and operable to predict at least one post-hire outcome for at least one job performance criterion if the individual were to be employed by the employer, the predictor providing a prediction of the at least one post-hire outcome for the at least one job performance criterion based upon correlations of the stored answers with answers to sets of questions by other individuals for which post-hire information has been collected; and
- an electronic results provider providing an output indicative of the at least one post-hire outcome for the at least one job performance criterion to assist in determining suitability of the individual for employment by the employer;
- wherein the at least one post-hire outcome for the at least one job performance criterion comprises a predicted probability that a particular outcome value range for the at least one job performance criterion will be observed.

5. An apparatus for assisting in determining suitability of an individual for employment by an employer, the apparatus comprising:
- an electronic data interrogator operable to present a first set of a plurality of questions to the individual;
- an electronic answer capturer operable to electronically store answers by the individual to at least a selected plurality of the first set of questions presented to the individual;
- an electronic predictor responsive to the stored answers and operable to predict at least one post-hire outcome for at least one job performance criterion if the individual were to be employed by the employer, the predictor providing a prediction of the at least one post-hire outcome for the at least one job performance criterion based upon correlations of the stored answers with answers to sets of questions by other individuals for which post-hire information has been collected; and
- an electronic results provider providing an output indicative of the at least one post-hire outcome for the at least one job performance criterion to assist in determining suitability of the individual for employment by the employer;
- wherein the at least one post-hire outcome for the at least one job performance criterion comprises a predicted range of values for a continuous variable.

6. An apparatus for assisting in determining suitability of an individual for employment by an employer, the apparatus comprising:
- an electronic data interrogator means operable to present a first set of a plurality of question means to the individual;
- an electronic answer capturer means operable to electronically store answers by the individual to at least a selected plurality of the first set of question means presented to the individual;
- an electronic predictor means responsive to the stored answers and operable to predict at least one post-hire outcome for at least one job performance criterion if the individual were to be employed by the employer, the predictor means providing a prediction of the at least one post-hire outcome for the at least one job performance criterion based upon correlations of the stored answers with answers to sets of questions by other individuals for which post-hire information has been collected; and
- an electronic results provider means providing an output indicative of the at least one post-hire outcome for the at least one job performance criterion to assist in determining suitability of the individual for employment by the employer;
- wherein the at least one post-hire outcome indicates whether the individual is predicted to be involuntarily terminated; and
- wherein the first set of the plurality of questions to the individual has been subjected to performance-driven item rotation comprising at least one validation cycle during which at least one of the questions has been retained, at least one former question has been dropped, and at least one experimental question has been inserted.

7. One or more computer-readable storage media having stored thereon computer-executable instructions for performing a method for assisting in determining suitability of an individual for employment by an employer, the method comprising:

presenting a first set of a plurality of questions to the individual;

electronically storing answers of the individual to at least a selected plurality of the first set of questions presented to the individual;

responsive to the stored answers, predicting at least one post-hire outcome for at least one job performance criterion if the individual were to be employed by the employer, the predictor providing a prediction of the at least one post-hire outcome for the at least one job performance criterion based upon correlations of the stored answers with answers to sets of questions by other individuals for which post-hire information has been collected; and providing an output indicative of the at least one post-hire outcome for the at least one job performance criterion to assist in determining suitability of the individual for employment by the employer;

wherein the first set of the plurality of questions to the individual has been subjected to performance-driven item rotation comprising at least one validation cycle during which at least one of the questions has been retained, at least one former question has been dropped, and at least one experimental question has been inserted.

8. The one or more computer-readable storage media of claim 7 wherein:

the predicting is performed by a model; and the method further comprises refining the model based on real-time electronic collection of data.

9. The one or more computer-readable storage media of claim 7 wherein the method further comprises:

presenting a graphic image to convey a relative position of the individual for a ranked job performance criterion.

10. The one or more computer-readable storage media of claim 7 wherein:

the predicting is performed by a model; and the model has been subjected to a plurality of successive validation cycles, the successive validation cycles validating effectiveness of the stored answers input to the model in accurately predicting the at least one post-hire outcome for the least one job performance criterion.

11. One or more computer-readable storage media having stored thereon computer-executable instructions for performing a method for assisting in determining suitability of an individual for employment by an employer, the method comprising:

presenting a first set of a plurality of questions to the individual;

electronically storing answers of the individual to at least a selected plurality of the first set of questions presented to the individual;

responsive to the stored answers, predicting at least one post-hire outcome for at least one job performance criterion if the individual were to be employed by the employer, the predictor providing a prediction of the at least one post-hire outcome for the at least one job performance criterion based upon correlations of the stored answers with answers to sets of questions by other individuals for which post-hire information has been collected; and providing an output indicative of the at least one post-hire outcome for the at least one job performance criterion to assist in determining suitability of the individual for employment by the employer;

wherein the predicting is achieved via a model stored in a computer-readable storage medium and accepting stored answers as input; and wherein the model has been subjected to a plurality of successive validation cycles, the successive validation cycles validating effectiveness of the input answers to the model in accurately predicting the at least one post-hire outcome for the least one job performance criterion.

12. A method comprising:

before a job applicant is hired, collecting job application data from the job applicant in real time electronically, wherein the job application data comprises responses to items in an electronic job application;

based on the job application data, generating a prediction of job performance of the job applicant based on a predictive model stored in a computer-readable storage medium;

based on the prediction of job performance, deciding to hire the applicant;

after hiring the job applicant, measuring a job performance metric of the job applicant; and via performance-driven item rotation, refining the electronic job application and the predictive model stored in the computer-readable storage medium based at least on the job applicant data collected from the job applicant in real time electronically and the job performance metric of the applicant;

wherein the refining comprises retaining at least one of the items in the electronic job application, removing at least one of the items in the electronic job application, and inserting at least one experimental item into the electronic job application.

* * * * *

UNITED STATES PATENT AND TRADEMARK OFFICE
CERTIFICATE OF CORRECTION

PATENT NO. : 7,080,057 B2  
APPLICATION NO. : 09/922197  
DATED : July 18, 2006  
INVENTOR(S) : Scarborough et al.

It is certified that error appears in the above-identified patent and that said Letters Patent is hereby corrected as shown below:

On the Title Page:
    On Page 2, under U.S. Patent Documents, "Nadkami" should read -- Nadkarni --
    On Page 2, under U.S. Patent Documents, "6,466,914 B1" should read -- 6,466,914 B2 --
    On Page 2, under U.S. Patent Documents, "6,681,098 B1" should read -- 6,681,098 B2 --
    On Page 2, under U.S. Patent Documents, add U.S. Patent Application --60/211,044    06/2000    Dewar --
    On Page 4, column 2, fourteenth reference, "May 11, 2003" should read -- May 11, 2000 --
    On Page 5, column 2, first reference, "systesms" should read -- systems --
    On Page 6, column 2, seventh reference, "ips. diagnostic" should read -- ips/diagnostic --
    On Page 7, column 2, second reference, "Students Applicants" should read -- Student Applicants --
    On Page 7, column 2, third reference, "paradigns" should read -- paradigms --

In the Specification:
    Column 5, line 24, "one or new ones can be added)." should read -- one or more new ones can be added) --
    Column 6, line 1, "Fig. 8 is a block diagram an exemplary" should read -- Fig. 8 is a block diagram of an exemplary --
    Column 8, line 63, "with the model begins" should read -- when the model begins --
    Column 10, line 65, "so they was included" should read -- so they were included--
    Column 14, line 41, "neural networks" should read -- neural networks --
    Column 27, line 3, "$p_1, P_2, \ldots, p_n$" should read -- $p_1, p_2, \ldots, p_n$ --

Column 27, line 8, " $P = \prod_{l=1}^{n} p_1$ " should read -- $P = \prod_{i=1}^{n} p_i$ --

UNITED STATES PATENT AND TRADEMARK OFFICE
CERTIFICATE OF CORRECTION

PATENT NO. : 7,080,057 B2  
APPLICATION NO. : 09/922197  
DATED : July 18, 2006  
INVENTOR(S) : Scarborough et al.

Page 2 of 2

It is certified that error appears in the above-identified patent and that said Letters Patent is hereby corrected as shown below:

In the Specification (continued):

Column 27, line 24, " $H(X) = -\sum_{l=1}^{n} p_l \log_2 p_l$ " should read -- $H(X) = -\sum_{i=1}^{n} p_i \log_2 p_i$ --

Column 27, line 27, "where p, is" should read -- where $p_i$ is --
Column 28, line 39, "selected has having" should read -- selected as having --
Column 32, line 18, "people" should read -- people. --

Column 33, line 48, " $P = \prod_{l=1}^{n} p_l$ " should read -- $P = \prod_{i=1}^{n} p_i$ --

Column 33, line 62, " $H(X) = -\sum_{l=1}^{n} p_l \log_2 p_l$ " should read -- $H(X) = -\sum_{i=1}^{n} p_i \log_2 p_i$ --

Column 38, line 9, "cardinalities. (e.g.," should read -- cardinalities (e.g., --
Column 39, line 48, "for the least one" should read -- for the at least one --
Column 41, line 50, "for the least one" should read -- for the at least one --
Column 42, line 27, "for the least one" should read -- for the at least one --

Signed and Sealed this

Second Day of January, 2007

JON W. DUDAS  
*Director of the United States Patent and Trademark Office*